United States Patent
Yilmaz et al.

(10) Patent No.: US 10,917,934 B2
(45) Date of Patent: *Feb. 9, 2021

(54) RACE CONDITION AVOIDANCE BETWEEN MASTER BASE STATION INITIATED SECONDARY BASE STATION RELEASE AND SECONDARY BASE STATION INITIATED SECONDARY BASE STATION CHANGE PROCEDURES

(71) Applicant: Telefonaktiebolaget LM Ericsson (publ), Stockholm (SE)

(72) Inventors: Osman Nuri Can Yilmaz, Espoo (FI); Alexander Vesely, Feldbach (AT); Stefan Wager, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/744,300

(22) Filed: Jan. 16, 2020

(65) Prior Publication Data
US 2020/0154510 A1    May 14, 2020

Related U.S. Application Data

(63) Continuation of application No. 16/097,369, filed as application No. PCT/SE2018/050621 on Jun. 14, 2018, now Pat. No. 10,568,162.

(Continued)

(51) Int. Cl.
*H04W 76/34*    (2018.01)
*H04W 8/08*    (2009.01)
(Continued)

(52) U.S. Cl.
CPC ............ *H04W 76/34* (2018.02); *H04W 8/08* (2013.01); *H04W 76/18* (2018.02); *H04W 76/27* (2018.02); *H04W 84/20* (2013.01)

(58) Field of Classification Search
CPC ..... H04W 76/34; H04W 76/18; H04W 76/27; H04W 8/08; H04W 84/20
See application file for complete search history.

(56) References Cited

U.S. PATENT DOCUMENTS 9,872,336 B2    1/2018    Dinan
2018/0184475 A1    6/2018    Babaei et al.
(Continued)

OTHER PUBLICATIONS

3rd Generation Partnership Project; LTE; Evolved Universal Terrestrial Radio Access Network (E-UTRAN); X2 Application Protocol (X2AP), (3GPP TS 36.423 version 15.2.0 Release 15), Jul. 2018, 390 pages.
(Continued)

*Primary Examiner* — Melvin C Marcelo
(74) *Attorney, Agent, or Firm* — Sage Patent Group

(57) ABSTRACT

Systems and methods are disclosed herein that relate to Dual Connectivity (DC) for a wireless device is a wireless communication network. In some embodiments, a method in a secondary node for providing, along with a master node, DC for a wireless device such that the wireless device is configured to utilize resources provided by both the master node and the secondary node in a wireless communication network is disclosed. The method comprises receiving, from the master node, a release request. The release request is a request to release a wireless device context of the wireless device or to release resources for the wireless device. The method further comprises sending a release reject to the master node. The release reject is an indication that the secondary node rejects the release request.

19 Claims, 24 Drawing Sheets

Related U.S. Application Data

(60) Provisional application No. 62/587,379, filed on Nov. 16, 2017, provisional application No. 62/521,164, filed on Jun. 16, 2017.

(51) Int. Cl.
  *H04W 76/18* (2018.01)
  *H04W 76/27* (2018.01)
  *H04W 84/20* (2009.01)

(56) References Cited

U.S. PATENT DOCUMENTS

| | | | |
|---|---|---|---|
| 2018/0279262 | A1 | 9/2018 | Babaei et al. |
| 2019/0045564 | A1* | 2/2019 | Hayashi ............... H04W 16/32 |
| 2019/0208453 | A1 | 7/2019 | Xu et al. |

OTHER PUBLICATIONS

3rd Generation Partnership Project; Nokia, Remaining Details for SeNB Failure Reporting, 3GPP TSG-RAN WG2 Meeting #87bis, R2-144363, Shanghai, China, Oct. 6-10, 2014, XP050876573 8 pages.

3rd Generation Partnership Project; Ericsson, Race conditions in case of SN release—TP for 36.300, 3GPP TSG-RAN WG3 Meeting #98, R3-17xxxx, Reno, NV, U.S., Nov. 27-Dec. 1, 2017, 1 Page.

3rd Generation Partnership Project; Ericsson, Race conditions in case of SNrelease—TP for 36.423, 3GPP TSG-RAN WG3 Meeting #98, R3-17xxxx, Reno, NV, U.S., Nov. 27-Dec. 1, 2017, 19 Pages.

3rd Generation Partnership Project; Ericsson, Race conditions in case of SN release and Stage 2 Text Proposal 37.340, 3GPP TSG-RAN WG3 Meeting #98, R2-17xxxx, Reno, Nevada, USA, Nov. 27-Dec. 1, 2017, 14 Pages.

3rd Generation Partnership Project; Ericsson, Race conditions in case of SN release and Stage 2 Text Proposal 37.340, 3GPP TSG-RAN WG3 Meeting #98, R2-174743, Reno, Nevada, USA, Nov. 27-Dec. 1, 2017, 14 Pages.

$3^{rd}$ Generation Partnership Project; Ericsson, Technical Specification Group Radio Access Network; Evolved Universal Terrestrial Radio Access (E-UTRA) and NR; Multi-connectivity; Stage 2 (Release 15), 3GPP TS 37.340 V0.1.1 (Jun. 2017), 30 Pages.

3rd Generation Partnership Project; Ericsson, Race conditions in case of SN release—TP for 36.300, 3GPP TSG-RAN WG3 Meeting #98, R3-174740, Reno, NV, U.S., Nov. 27-Dec. 1, 2017, 1 Page.

3rd Generation Partnership Project; Ericsson, Race conditions in case of SN release—TP for 36.423, 3GPP TSG-RAN WG3 Meeting #98, R3-174741, Reno, NV, U.S., Nov. 27-Dec. 1, 2017, 19 Pages.

3GPP TS 36.423 V15.0.0, pp. 74-75. (Year: 2017).

3GPP TS 36.423 V14.2.0, p. 52. (Year: 2017).

International Search Report and Written Opinion of the International Searching Authority, PCT/SE2018/050621, dated Aug. 27, 2018, 7 pages.

"Technical Specification Group Radio Access Network; Evolved Universal Terrestrial Radio Access Network (E-UTRAN); X2 application protocol (X2AP)" (Release 15), 3GPP TS 36.423 V15.2.0 (Jun. 2018) XP014319761, 389 pages.

First Examination Report dated Sep. 30, 2020 for Indian Patent Application No. 201847047329, 6 pages.

* cited by examiner

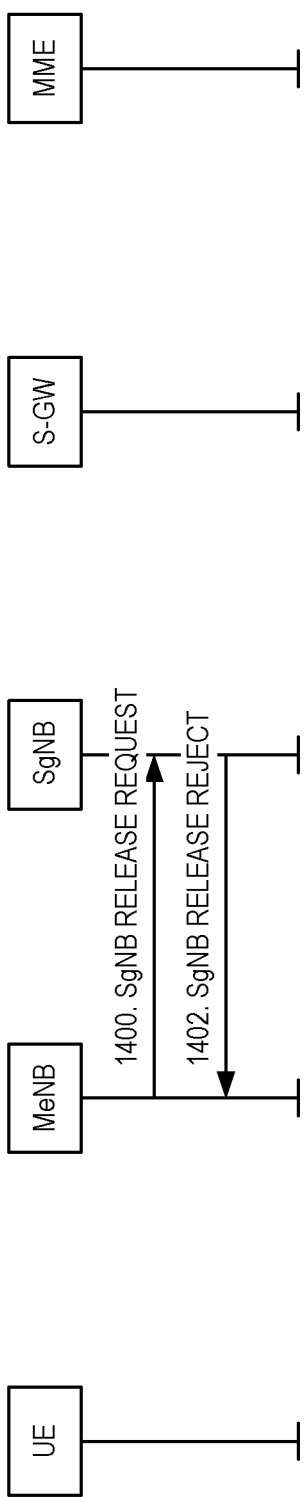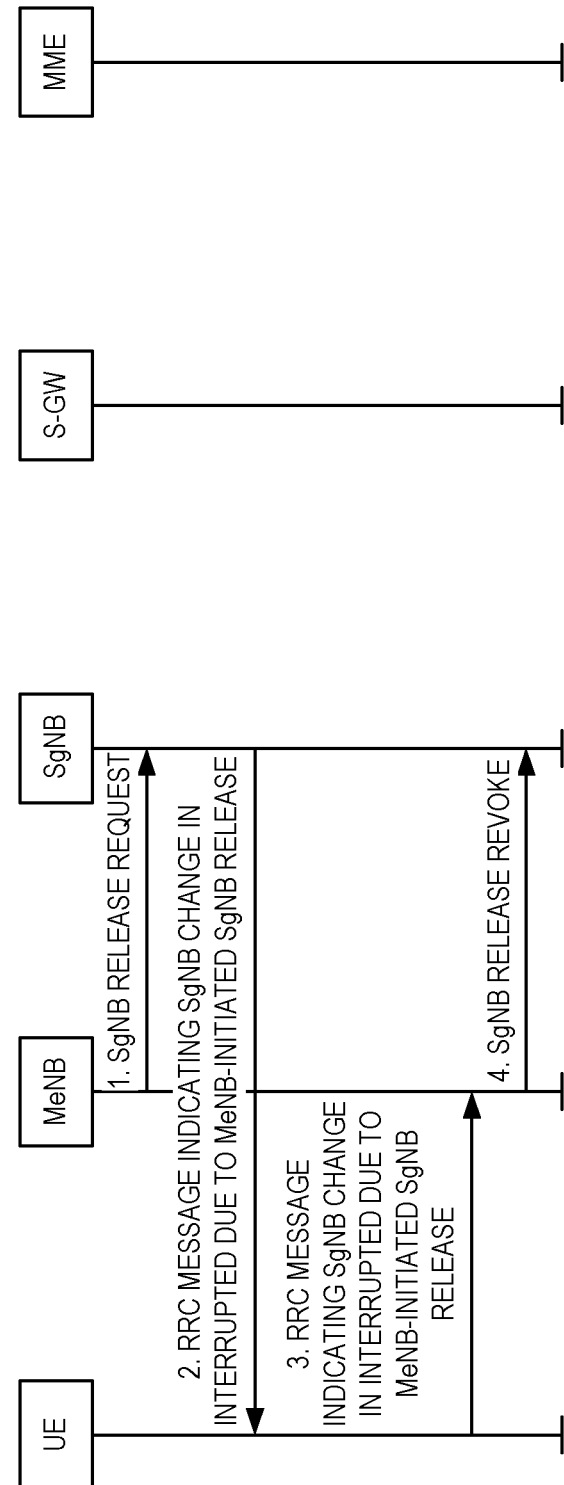

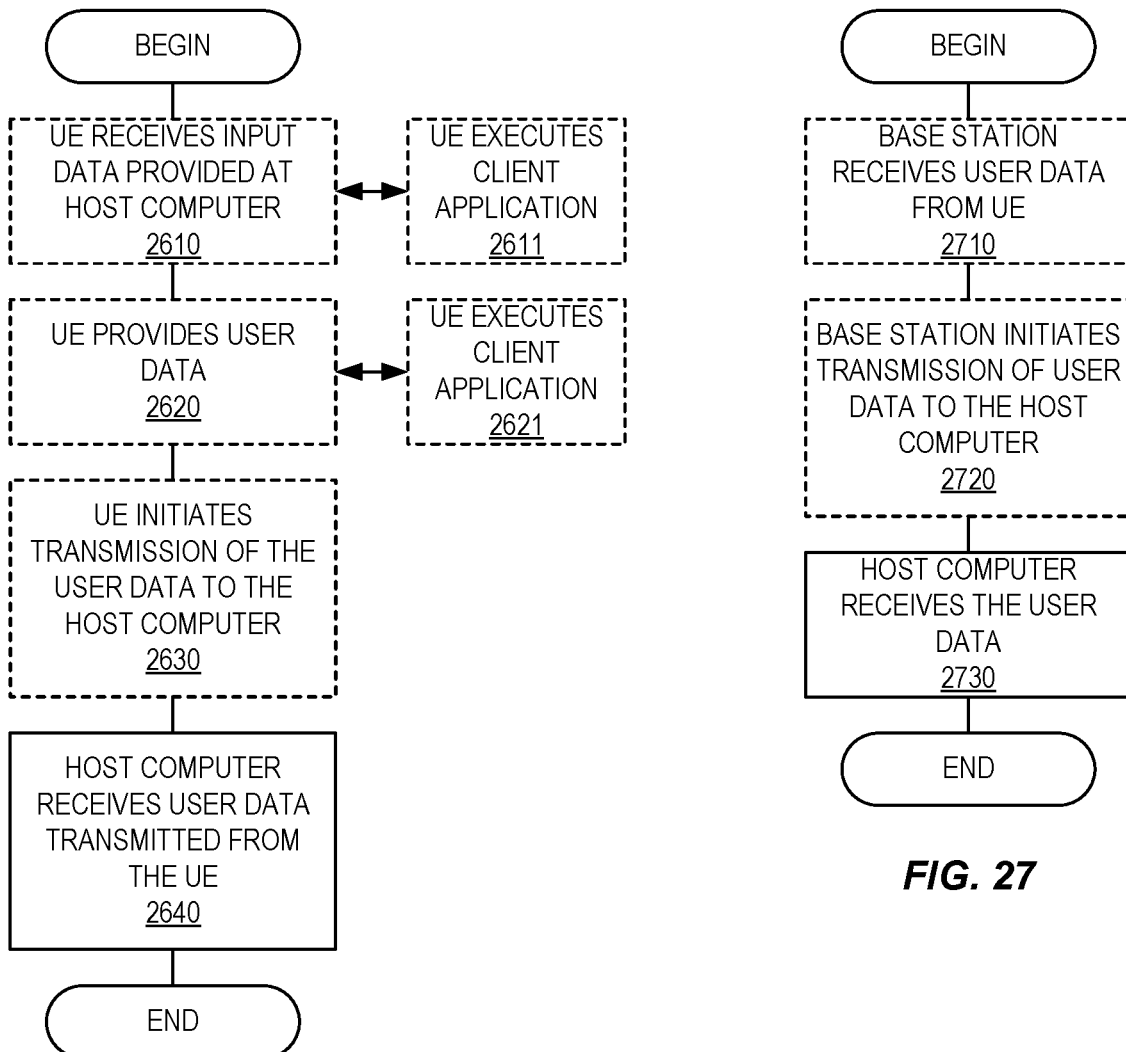

RACE CONDITION AVOIDANCE BETWEEN MASTER BASE STATION INITIATED SECONDARY BASE STATION RELEASE AND SECONDARY BASE STATION INITIATED SECONDARY BASE STATION CHANGE PROCEDURES

RELATED APPLICATIONS

This application is a continuation of U.S. application Ser. No. 16/097,369, filed Oct. 29, 2019, which is a 35 U.S.C. § 371 national stage application of PCT International Application No. PCT/SE2018/050621 filed on Jun. 14, 2018, which in turns claims domestic priority to U.S. Provisional Patent Application No. 62/521,164, filed on Jun. 16, 2017, and to U.S. Provisional Patent Application No. 62/587,379, filed on Nov. 16, 2017. The disclosures and contents of all of the above referenced applications are hereby incorporated by reference herein in their entireties.

TECHNICAL FIELD

The present disclosure relates to Dual-Connectivity (DC) in a wireless communication network and, more specifically, to master base station initiated secondary base station release and secondary base station initiated secondary base station change procedures in a cellular communications network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Various Third Generation Partnership Project (3GPP) documents referred herein are publicly available at 29w.3gpp.org.

Overall requirements for the Next Generation (NG) architecture (see Technical Report (TR) 23.799, Study on Architecture for Next Generation) and, more specifically the NG Access Technology (see TR 38.913, Study on Scenarios and Requirements for Next Generation Access Technologies) will impact the design of Fifth Generation (5G) (see RP-160671, New SID Proposal: Study on New Radio Access Technology, DoCoMo) from mobility to control plane design and mechanisms.

It is essential to design how the basic Radio Resource Monitoring (RRM) functions, such as mobility handling, need to be distributed among Long Term Evolution (LTE) and New Radio (NR) Radio Resource Control (RRC) entities; as well as how the related control plane signaling, such as Secondary enhanced or evolved Node B (SeNB)/Secondary gNB (where gNB refers to a NR base station) change/release, should be exchanged between master and secondary nodes so that seamless mobility can be effectively supported.

1 LTE

In LTE Dual Connectivity (DC), thanks to the mutual intelligibility between master and secondary nodes, i.e., Master enhanced or evolved Node B (MeNB) and SeNB, in terms of mobility procedures, MeNB is able to maintain the RRM measurement configuration of the User Equipment device (UE). Furthermore, the MeNB may decide to ask an SeNB to provide additional resources (serving cells) for a UE, e.g., based on the received measurement reports or traffic conditions or bearer types as it is straightforward to interpret those by the RRC entity located at the master node. Therefore, the mobility can mainly be coordinated by the MeNB in case of LTE DC.

1.1 SeNB Release Procedure in Case of LTE DC

As illustrated in FIGS. 1 and 2 based on TS 36.300, the SeNB Release procedure may be initiated either by the MeNB or by the SeNB and is used to initiate the release of the UE context at the SeNB. The recipient node of this request cannot reject. It does not necessarily need to involve signaling towards the UE, e.g., RRC connection re-establishment due to Radio Link Failure (RLF) in the MeNB.

FIG. 1 illustrates the SeNB release procedure when initiated by the MeNB. FIG. 2 illustrates the SeNB release procedure when initiated by the SeNB.

1.2 SeNB Change Procedure in Case of LTE DC

As illustrated in 3 which is based on TS 36.300, the SeNB change procedure can be initiated by MeNB and used to transfer the UE context from a source SeNB to a target SeNB and to change the Secondary Cell Group (SCG) configuration in the UE from one SeNB to another SeNB.

2 NR

The proposed Secondary gNB (SgNB) procedures mainly follow the same principles as in the corresponding LTE SeNB release procedures. On the other hand, there are also some changes foreseen in the Enhanced Universal Terrestrial Radio Access Network DC (EN-DC) procedures with respect to LTE DC, such as in the SgNB change procedure since the SgNB is the main responsible node for managing secondary node (NR) mobility. Current Stage 3 Text in 3GPP Technical Specification (TS) 37.340 is given below.

2.1 Secondary Node Change (Master Node (MN)/Secondary Node (SN) Initiated)

2.1.1 EN-DC

The change of Secondary Node procedure is initiated either by the MeNB or SgNB and used to transfer a UE context from a source SgNB to a target SgNB and to change the SCG configuration in UE from one SgNB to another.

The Change of Secondary Node procedure always involves signaling over Master Cell Group (MCG) Signaling Radio Bearer (SRB) towards the UE.

FIG. 4 shows an example signaling flow for the MN initiated Change of SN:

1/2. The MeNB initiates the change of SgNB by requesting the target SgNB to allocate resources for the UE by means of the SgNB Addition procedure. If forwarding is needed, the target SgNB provides forwarding addresses to the MeNB.

Availability of Random Access Channel (RACH)—less access is For Further Study (FFS).

3. If the allocation of target SgNB resources was successful, the MeNB initiates the release of the source SgNB resources. If data forwarding is needed, the MeNB provides data forwarding addresses to the source SgNB. Either direct data forwarding or indirect data forwarding is used for the SCG bearer. Only indirect data forwarding is used for the MCG Split bearer. Reception of the SgNB Release Request message triggers the source SgNB to stop providing user data to the UE and, if applicable, to start data forwarding.

Data forwarding for SCG split bearer is FFS.

4/5. The MeNB triggers the UE to apply the new configuration. The MeNB indicates to the UE the new configuration in the RRCConnectionReconfiguration message including the NR RRC configuration message generated by the target SgNB. The UE applies the new configuration and sends the RRCConnectionReconfigurationComplete message, including the encoded NR RRC response message for the target SgNB. In case the UE is unable to comply with (part of) the configuration included in the RRCConnectionReconfiguration message, it performs the reconfiguration failure procedure.

6. If the RRC connection reconfiguration procedure was successful, the MeNB informs the target SgNB via SgNBReconfigurationComplete message with the encoded NR RRC response message for the target SgNB.

7. The UE synchronizes to the target SeNB.

8/9. If applicable, data forwarding from the source SgNB takes place. It may be initiated as early as the source SgNB receives the SgNB Release Request message from the MeNB.

10-14. If one of the bearer contexts was configured with the SCG or SCG split bearer option at the source SgNB, path update is triggered by the MeNB.

15. Upon reception of the UE Context Release message, the source SgNB can release radio and C-plane related resource associated to the UE context. Any ongoing data forwarding may continue.

FIG. 5 shows an example signaling flow for the Change of Secondary Node initiated by the SN:

1. The source SgNB initiates the SgNB change procedure by sending SgNB Change Required message which contains a candidate target cell or target node Identifier (ID).

FFS whether cell list can be indicated in step 1.

2/3. The MeNB requests the target SgNB to allocate resources for the UE by means of the SgNB Addition procedure. If forwarding is needed, the target SgNB provides forwarding addresses to the MeNB.

4. If the allocation of target SgNB resources was successful, the MeNB initiates the release of the source SgNB resources. If data forwarding is needed, the MeNB provides data forwarding addresses to the source SgNB. Either direct data forwarding or indirect data forwarding is used for the SCG bearer. Only indirect data forwarding is used for the MCG Split bearer. Reception of the SgNB Release Request message triggers the source SgNB to stop providing user data to the UE and, if applicable, to start data forwarding.

Data forwarding for SCG split bearer is FFS.

5/6. The MeNB/SgNB triggers the UE to apply the new configuration. The MeNB indicates the new configuration to the UE in the RRCConnectionReconfiguration message including the NR RRC configuration message generated by the target SgNB. The UE applies the new configuration and sends the RRCConnectionReconfigurationComplete message, including the encoded NR RRC response message for the target SgNB. In case the UE is unable to comply with (part of) the configuration included in the RRCConnectionReconfiguration message, it performs the reconfiguration failure procedure.

It is FFS whether the MeNB and/or the SgNB triggers the UE to apply the new configuration.

7. If the RRC connection reconfiguration procedure was successful, the MeNB informs the target SgNB via SN Reconfiguration Complete message with the encoded NR RRC response message for the target SgNB.

8. The UE synchronizes to the target SgNB.

9/10. If applicable, data forwarding from the source SgNB takes place. It may be initiated as early as the source SgNB receives the SgNB Release Request message from the MeNB.

11-15. If one of the bearer contexts was configured with the SCG bearer or SCG split bearer option at the source SgNB, path update is triggered by the MeNB.

16. Upon reception of the UE Context Release message, the source SgNB can release radio and C-plane related resource associated to the UE context. Any ongoing data forwarding may continue.

2.1.2 Multi-Radio Access Technology Dual Connectivity (MR-DC)

The MN initiated SN change procedure for MR-DC is used to transfer a UE context from the source SN to a target SN and to change the SCG configuration in UE from one SN to another.

The Secondary Node Change procedure always involves signaling over MCG SRB towards the UE.

FIG. 6 shows an example signalling flow for the SN Change initiated by the MN. Note that some modifications of the process of FIG. 6 may be made in order to, e.g., align the actual Xn and RRC message and Information Element (IE) names. As illustrated:

1/2. The MN initiates the SN change by requesting the target SN to allocate resources for the UE by means of the SN Addition procedure. The MN may include measurement results related to the target SN. If data forwarding is needed, the target SN provides data forwarding addresses to the MN.

NOTE: The MN may send the SN Modification Request message (to the source SN) to request the current SCG configuration before step 1.

3. If the allocation of target SN resources was successful, the MN initiates the release of the source SN resources. If data forwarding is needed the MN provides data forwarding addresses to the source SN. Either direct data forwarding or indirect data forwarding is used for SCG bearers and SCG split bearer. Only indirect data forwarding is used for MCG Split bearers. Reception of the SN Release Request message triggers the source SN to stop providing user data to the UE and, if applicable, to start data forwarding.

4/5. The MN triggers the UE to apply the new configuration. The MN indicates the new configuration to the UE in the MN RRC reconfiguration message including the target SN RRC configuration message. The UE applies the new configuration and sends the MN RRC reconfiguration complete message, including the encoded SN RRC response message for the target SN. In case the UE is unable to comply with (part of) the configuration included in the MN RRC reconfiguration message, it performs the reconfiguration failure procedure.

6. If the RRC connection reconfiguration procedure was successful, the MN informs the target SN via SN Reconfiguration Complete message with the encoded SN RRC message for the target SN.

7. The UE synchronizes to the target SN.

8/9. If applicable, data forwarding from the source SN takes place. It may be initiated as early as the source SN receives the SN Release Request message from the MN.

10-14. If one of the Protocol Data Unit (PDU) session/Quality of Service (QoS) Flow was configured with the SCG or SCG split bearer option at the source SN, path update procedure is triggered by the MN.

The exact procedure of Path Switch for PDU sessions is FFS.

15. Upon reception of the UE Context Release message, the source SN can release radio and C-plane related resource associated to the UE context. Any ongoing data forwarding may continue.

2.2 SCG Change

2.2.1 EN-DC

"SCG change" refers to a synchronous SCG reconfiguration procedure towards the UE involving random access on a Primary Secondary Cell (PSCell). This procedure is used to establish SCG and can be used to reconfigure the SCG configuration. During SCG change, Medium Access Control (MAC) configured for SCG is reset and Radio Link Control (RLC) configured for SCG is reestablished regardless of the bearer type(s) established on SCG. For SCG bearer and SCG split bearer, Packet Data Convergence Protocol (PDCP) configured for SCG is reestablished.

It is FFS whether PDCP configured for SCG is reestablished at SCG change for SCG and SCG split bearers.

In case of reconfiguration from split to MCG bearer, RLC configured for SCG is released; in case of reconfiguration from SCG split bearer to SCG bearer, RLC configured for MCG is released. During SCG change, Secondary Node Key (S-KgNB) is refreshed. To perform SCG change within the same SgNB, the SgNB Modification procedure as described in section 10.3.1 of 3GPP TS 37.340 V0.1.1 is used and in this case, the path switch and data forwarding for Data Radio Bearer (DRB) on SCG may be suppressed. To perform SCG change between different SgNBs, the change of SgNB as described in section 10.5.1 of 3GPP TS 37.340 V0.1.1 is used.

2.3 SN Release

2.3.1 EN-DC

Details of the RRC signaling are FFS and pending RAN2 agreement.

The Secondary Node Release procedure may be initiated either by the MeNB or by the SgNB and is used to initiate the release of the UE context at the SgNB. The recipient node of this request cannot reject it. It does not necessarily need to involve signaling towards the UE, e.g., in case of the RRC connection reestablishment due to RLF in MeNB.

FIG. 7 shows an example signaling flow for the MN initiated Secondary Node Release procedure.

1. The MeNB initiates the procedure by sending the SgNB Release Request message. If data forwarding is requested, the MeNB provides data forwarding addresses to the SgNB.

2/3. If required, the MeNB indicates in the RRCConnectionReconfiguration message towards the UE that the UE shall release the entire SCG configuration. In case the UE is unable to comply with (part of) the configuration included in the RRCConnectionReconfiguration message, it performs the reconfiguration failure procedure.

NOTE: If data forwarding is applied, timely coordination between steps 1 and 2 may minimize gaps in service provision. This is however regarded to be an implementation matter.

4/5. Data forwarding from the SgNB to the MeNB takes place.

6. If applicable, the path update procedure is initiated.

7. Upon reception of the UE Context Release message, the SeNB can release radio and C-plane related resource associated to the UE context. Any ongoing data forwarding may continue.

FIG. 8 shows an example signaling flow for the SN initiated Secondary Node Release procedure.

1. The SeNB initiates the procedure by sending the SgNB Release Required message which does not contain inter-node message.

2. If data forwarding is requested, the MeNB provides data forwarding addresses to the SgNB in the SgNB Release Confirm message. The SgNB may start data forwarding and stop providing user data to the UE as early as it receives the SgNB Release Confirm message.

3/4. If required, the MeNB indicates in the RRCConnectionReconfiguration message towards the UE that the UE shall release the entire SCG configuration. In case the UE is unable to comply with (part of) the configuration included in the RRCConnectionReconfiguration message, it performs the reconfiguration failure procedure.

NOTE: If data forwarding is applied, timely coordination between steps 2 and 3 may minimize gaps in service provision. This is however regarded to be an implementation matter.

5/6. Data forwarding from the SgNB to the MeNB takes place.

7. If applicable, the path update procedure is initiated.

8. Upon reception of the UE Context Release message, the SgNB can release radio and C-plane related resource associated to the UE context. Any ongoing data forwarding may continue.

2.4 Inter-Master Node Handover

2.4.1 EN-DC

Inter-Master Node handover with/without MN initiated Secondary Node change is used to transfer context data from a source MN to a target MN while the context at the SN is kept or moved to another SN. During an Inter-Master Node handover, the target MN decides whether to keep or change the SN (or release the SN, as described in section 10.8 of 3GPP TS 37.340 V0.1.1).

NOTE: Inter Radio Access Technology (RAT) Inter-Master node handover with/without SN change is not supported in this version of the protocol (i.e., no transition from EN-DC to NR-NR DC).

FIG. 9 shows an example signaling flow for inter-Master Node handover with or without MN initiated Secondary Node change.

NOTE: For an inter-Master Node handover without Secondary Node change, the source SN and the target SN shown in FIG. 9 are the same node.

1. The source MN starts the handover procedure by initiating the X2 Handover Preparation procedure including both MCG and SCG configuration. The source MN includes the (source) SN UE X2AP ID, SN ID, and the UE context in the (source) SN in the Handover Request message.

NOTE: The source MN may send the SgNB Modification Request message (to the source SN) to request the current SCG configuration before step 1.

2. If the target MN decides to keep the SN, the target MN sends SN Addition Request to the SN including the SN UE X2AP ID as a reference to the UE context in the SN that was established by the source MN. If the target MN decides to change the SN, the target MN sends the SgNB Addition Request to the target SN including the UE context in the source SN that was established by the source MN.

3. The (target) SN replies with SN Addition Request Acknowledge.

4. The target MN includes within the Handover Request Acknowledge message a transparent container to be sent to the UE as an RRC message to perform the handover, and may also provide forwarding addresses to the source MN. The target MN indicates to the source MN that the UE context in the SN is kept if the target MN and the SN decided to keep the UE context in the SN in step 2 and step 3.

5. The source MN sends SN Release Request to the (source) SN. The source MN indicates to the (source) SN that the UE context in SN is kept, if it receives the indication from the target MN. If the indication as the UE context kept in SN is included, the SN keeps the UE context.

6. The source MN triggers the UE to apply the new configuration.

7/8. The UE synchronizes to the target MN and replies with RRCConnectionReconfigurationComplete message.

9. The UE synchronizes to the (target) SN.

10. If the RRC connection reconfiguration procedure was successful, the target MN informs the (target) SN via SgNB Reconfiguration Complete message.

11/12. Data forwarding from the source MN takes place. If the SN is kept, data forwarding may be omitted for SCG bearers and SCG split bearers. Direct data forwarding from the source MN to the SN is not possible for split bearers.

Data forwarding for the case when the SN is changed is FFS.

NOTE: Direct data forwarding may occur only for bearer type change.

13-16. The target MN initiates the S1 Path Switch procedure.

NOTE: If new uplink Tunnel Endpoint Identifiers (TE-IDs) of the Serving Gateway (S-GW) are included, the target MN performs MN initiated SN Modification procedure to provide them to the SN.

17. The target MN initiates the UE Context Release procedure towards the source MN.

18. Upon reception of the UE Context Release message, the (source) SN can release C-plane related resource associated to the UE context towards the source MN. Any ongoing data forwarding may continue. The SN shall not release the UE context associated with the target MN if the indication was included in the SN Release Request in step 5.

2.4.2 MR-DC with 5G Core Network (5GC)

MR-DC with the 5GC is not complete and is targeted for completion in June 2018.

Inter-MN handover with/without MN initiated SN change is used to transfer UE context data from a source MN to a target MN while the UE context at the SN is kept or moved to another SN. During an Inter-Master Node handover, the target MN decides whether to keep or change the SN (or release the SN, as described in section 10.8 of 3GPP TS 37.340 V0.1.1).

FIG. 10 shows an example signaling flow for inter-MN handover with or without MN initiated SN change.

Note that FIG. 10 may be revised to, e.g., align to the actual Xn and RRC message and IE names.

NOTE: For an inter-Master Node handover without Secondary Node change, the source SN and the target SN shown in FIG. 10 are the same node.

1. The source MN starts the handover procedure by initiating the Xn Handover Preparation procedure including both MCG and SCG configuration. The source MN includes the source SN UE XnAP ID, SN ID, and the UE context in the source SN in the Handover Request message.

NOTE: The source MN may send the SN Modification Request message (to the source SN) to request the current SCG configuration before step 1.

2. If the target MN decides to keep the source SN, the target MN sends SN Addition Request to the SN including the SN UE XnAP ID as a reference to the UE context in the SN that was established by the source MN. If the target MN decides to change the SN, the target MN sends the SN Addition Request to the target SN including the UE context in the source SN that was established by the source MN.

3. The (target) SN replies with SN Addition Request Acknowledge.

4. The target MN includes within the Handover Request Acknowledge message a transparent container to be sent to the UE as an RRC message to perform the handover, and may also provide forwarding addresses to the source MN. The target MN indicates to the source MN that the UE context in the SN is kept if the target MN and the SN decided to keep the UE context in the SN in step 2 and step 3.
5. The source MN sends SN Release Request message to the (source) SN. The source MN indicates to the (source) SN that the UE context in SN is kept if it receives the indication from the target MN. If the indication as the UE context kept in SN is included, the SN keeps the UE context.
6. The source MN triggers the UE to perform handover and apply the new configuration.
7/8. The UE synchronizes to the target MN and replies with MN RRC reconfiguration complete message.
9. The UE synchronizes to the (target) SN.
10. If the RRC connection reconfiguration procedure was successful, the target MN informs the (target) SN via SN Reconfiguration Complete message.
11/12. Data forwarding from the source MN takes place. If the SN is kept, data forwarding may be omitted for SCG bearers and SCG split bearers. Direct data forwarding from the source MN to the SN is not possible for MCG split bearers.
Data forwarding for the case when the SN is changed is FFS.
NOTE: Direct data forwarding may occur only for bearer type change.
13-16. The target MN initiates the PDU Session Path Switch procedure.
NOTE: If new uplink TEIDs of the User Plane Function (UPF) for SN are included, the target MN performs MN initiated SN Modification procedure to provide them to the SN.
The exact procedure of Path Switch for PDU sessions and whether uplink TEIDs are included is FFS.
17. The target MN initiates the UE Context Release procedure towards the source MN.
18. Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step 5.

2.5 Master Node to eNB/gNB Change 2.5.1 EN-DC

The Master Node to eNB Change procedure is used to transfer context data from a source MN/SN to a target eNB.
FIG. 11 shows an example signaling flow for the Master Node to eNB Change procedure:
1. The source MN starts the MN to eNB Change procedure by initiating the X2 Handover Preparation procedure, including both MCG and SCG configuration.
2. The target eNB includes the field in Handover (HO) command which releases SCG configuration, and may also provide forwarding addresses to the source MN.
3. If the allocation of target eNB resources was successful, the MN initiates the release of the source SN resources towards the source SN. If data forwarding is needed, the MN provides data forwarding addresses to the source SN. Either direct data forwarding or indirect data forwarding is used for SCG bearer. Only indirect data forwarding is used for MCG Split bearer. Reception of the SgNB Release Request message triggers the source SN to stop providing user data to the UE and, if applicable, to start data forwarding.
FFS whether direct data forwarding or indirect data forwarding is used for SCG split bearer.
4. The MN triggers the UE to apply the new configuration. Upon receiving the new configuration, the UE releases the entire SCG configuration.
5/6. The UE synchronizes to the target eNB.
7/8. If applicable, data forwarding from the source SN takes place. It may start as early as the source SN receives the SgNB Release Request message from the MN.
9-13. The target eNB initiates the S1 Path Switch procedure.
14. The target eNB initiates the UE Context Release procedure towards the source MN.
15. Upon reception of the UE Context Release message, the S-SN can release radio and C-plane related resource associated to the UE context. Any ongoing data forwarding may continue.

2.5.2 MR-DC with 5GC

MR-DC with the 5GC is not complete and is targeted for completion in June 2018.
The MN to NG-eNB/gNB Change procedure is used to transfer UE context data from a source MN/SN to a target NG-eNB/gNB.
FIG. 12 shows an example signalling flow for the MN to NG-eNB/gNB Change procedure. Note that some modifications may be applied to, e.g., align the actual Xn and RRC messages and IE names.
1. The source MN starts the MN to NG-eNB/gNB Change procedure by initiating the Xn Handover Preparation procedure, including both MCG and SCG configuration.
2. The target NG-eNB/gNB includes the field in HO command which releases the SCG configuration, and may also provide forwarding addresses to the source MN.
3. If the resource allocation of target NG-eNB/gNB was successful, the MN initiates the release of the source SN resources towards the source SN. If data forwarding is needed, the MN provides data forwarding addresses to the source SN. Either direct data forwarding or indirect data forwarding is used for SCG bearers. Only indirect data forwarding is used for MCG Split bearers. Reception of the SN Release Request message triggers the source SN to stop providing user data to the UE and, if applicable, to start data forwarding.
FFS whether direct data forwarding or indirect data forwarding is used for SCG split bearer.
4. The MN triggers the UE to perform HO and apply the new configuration. Upon receiving the new configuration, the UE releases the entire SCG configuration.
5/6. The UE synchronizes to the target NG-eNB/gNB.
7/8. If applicable, data forwarding from the source SN takes place. It may start as early as the source SN receives the SN Release Request message from the MN.
9-13. The target NG-eNB/gNB initiates the PDU Session Path Switch procedure.
The exact procedure of Path Switch for PDU sessions is FFS.
14. The target NG-eNB/gNB initiates the UE Context Release procedure towards the source MN.
15. Upon reception of the UE Context Release message from MN, the source SN can release radio and C-plane related resource associated to the UE context. Any ongoing data forwarding may continue.

SUMMARY

Systems and methods are disclosed herein that relate to Dual Connectivity (DC) for a wireless device is a wireless communication network. In some embodiments, a method in a secondary node for providing, along with a master node, DC for a wireless device such that the wireless device is configured to utilize resources provided by both the master node and the secondary node in a wireless communication network is disclosed. The method comprises receiving, from the master node, a release request. The release request is a request to release a wireless device context of the wireless device or to release resources for the wireless device. The method further comprises sending a release reject to the master node. The release reject is an indication that the secondary node rejects the release request.

In some embodiments, the release request comprises an indication of a cause of the release request.

In some embodiments, the method further comprises, prior to sending the release reject to the master node, determining that the secondary node is permitted to reject the release request. Further, in some embodiments, the release request comprises an indication of a cause of the release request, and the method further comprises, prior to sending the release reject to the master node, determining that the secondary node is permitted to reject the release request based on the cause of the release request. Further, in some embodiments, the cause of the release request is a cause related to mobility. In some other embodiments, the cause of the release request is one of one or more predefined or preconfigured causes for which the secondary node is allowed to reject a release request. Further, in some embodiments, the one or more predefined or preconfigured causes for which the secondary node is allowed to reject a release request comprise Secondary Cell Group (SCG) mobility. In some other embodiments, the cause of the release request is not any of one or more predefined or preconfigured causes for which the secondary node is not allowed to reject a release request. Further, in some embodiments, the one or more predefined or preconfigured causes for which the secondary node is not allowed to reject a release request comprise Master Cell Group (MCG) mobility.

In some embodiments, the release reject comprises an indication of a cause of the release reject. In some embodiments, the cause of the release reject is a cause related to mobility, a cause related to load balancing, or a cause related to inactivity.

In some embodiments, the master node and the secondary node are of different radio access technologies. Further, in some embodiments, the master node is a master Long Term Evolution (LTE) node and the secondary node is a secondary New Radio (NR) node. In some other embodiments, the master node is a master NR node and the secondary node is a secondary LTE node.

In some embodiments, receiving the release request is part of: a secondary node release procedure initiated by the master node; a secondary node change procedure initiated by the master node; a SCG change procedure; an inter-master node handover with secondary node change procedure; or a master node to enhanced or evolved Node B (eNB)/NR base station (gNB) change procedure.

Embodiments of a secondary node for providing, along with a master node, DC for a wireless device such that the wireless device is configured to utilize resources provided by both the master node and the secondary node in a wireless communication network are also disclosed. In some embodiments, the secondary node is adapted to receive, from the master node, a release request. The release request is a request to release a wireless device context of the wireless device or to release resources for the wireless device. The secondary node is also adapted to send a release reject to the master node. The release reject is an indication that the secondary node rejects the release request.

In some other embodiments, a secondary node for providing, along with a master node, DC for a wireless device such that the wireless device is configured to utilize resources provided by both the master node and the secondary node in a wireless communication network comprises processing circuitry configured to receive, from the master node via an interface, a release request. The release request is a request to release a wireless device context of the wireless device or to release resources for the wireless device. The processing circuitry is further configured to send a release reject to the master node via the interface. The release reject is an indication that the secondary node rejects the release request.

Embodiments of a method in a master node for providing, along with a secondary node, DC for a wireless device such that the wireless device is configured to utilize resources provided by both the master node and the secondary node in a wireless communication network are also disclosed. In some embodiments, the method comprises sending, to the secondary node, a release request. The release request is a request to release a wireless device context of the wireless device or to release resources for the wireless device. The method further comprises receiving a release reject from the secondary node. The release reject is an indication that the secondary node rejects the release request.

In some embodiments, the release request comprises an indication of a cause of the release request. In some embodiments, the cause of the release request is a cause related to mobility. In some other embodiments, the cause of the release request is one of one or more predefined or preconfigured causes for which the secondary node is allowed to reject a release request. Further, in some embodiments, the one or more predefined or preconfigured causes for which the secondary node is allowed to reject a release request comprise SCG mobility. In some other embodiments, the cause of the release request is not any of one or more predefined or preconfigured causes for which the secondary node is not allowed to reject a release request. Further, in some embodiments, the one or more predefined or preconfigured causes for which the secondary node is not allowed to reject a release request comprise MCG mobility.

In some embodiments, the release reject comprises an indication of a cause of the release reject. In some embodiments, the cause of the release reject is a cause related to mobility, a cause related to load balancing, or a cause related to inactivity.

In some embodiments, the master node and the secondary node are of different radio access technologies. In some embodiments, the master node is a master LTE node and the secondary node is a secondary NR node. In some other embodiments, the master node is a master NR node and the secondary node is a secondary LTE node.

In some embodiments, the release request is part of: a secondary node release procedure initiated by the master node; a secondary node change procedure initiated by the master node; a SCG change procedure; an inter-master node handover with secondary node change procedure; or a master node to eNB/gNB change procedure.

Embodiments of a master node for providing, along with a secondary node, DC for a wireless device such that the wireless device is configured to utilize resources provided by both the master node and the secondary node in a wireless communication network are also disclosed. In some embodiments, the master node is adapted to send, to the secondary node, a release request. The release request is a request to release a wireless device context of the wireless device or to release resources for the wireless device. The master node is further adapted to receive a release reject from the secondary node. The release reject is an indication that the secondary node rejects the release request.

In some embodiments, a master node for providing, along with a secondary node, DC for a wireless device such that the wireless device is configured to utilize resources provided by both the master node and the secondary node in a wireless communication network comprises processing circuitry configured to send, to the secondary node via an interface, a release request. The release request is a request to release a wireless device context of the wireless device or to release resources for the wireless device. The processing circuitry is further configured to receive a release reject from the secondary node via the interface, the release reject being an indication that the secondary node rejects the release request.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 13 and 14 illustrate the operation of MN and a SN in a DC communication in a wireless communication system to provide SN release in such a manner as to avoiding a race condition between network procedures in accordance with some embodiments of the present disclosure;

FIG. 15 illustrates another embodiment in which a User Equipment device (UE) may request a Master eNB (MeNB) to interrupt/revoke the release procedure via an MeNB Radio Resource Control (RRC) message provided that a Secondary gNB (SgNB) has informed the UE that ongoing SgNB mobility decision is interrupted by the MeNB Release Request;

FIG. 26 is a flowchart illustrating a method implemented in a communication system in accordance with one embodiment of the present disclosure;

FIG. 27 is a flowchart illustrating a method implemented in a communication system in accordance with one embodiment of the present disclosure;

DETAILED DESCRIPTION

Figure 1:
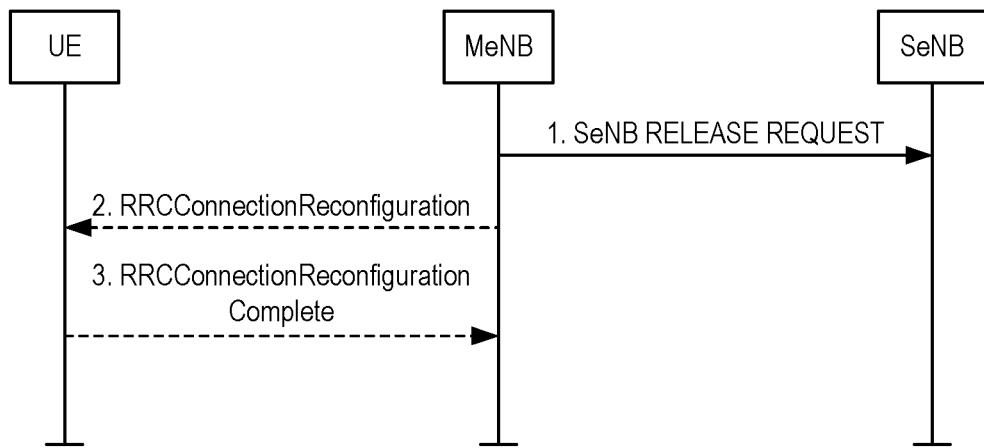
FIGS. 1 and 2 illustrate the Secondary enhanced or evolved Node B (SeNB) release procedure in the case of Dual Connectivity (DC) in Long Term Evolution (LTE)
Figure 2:
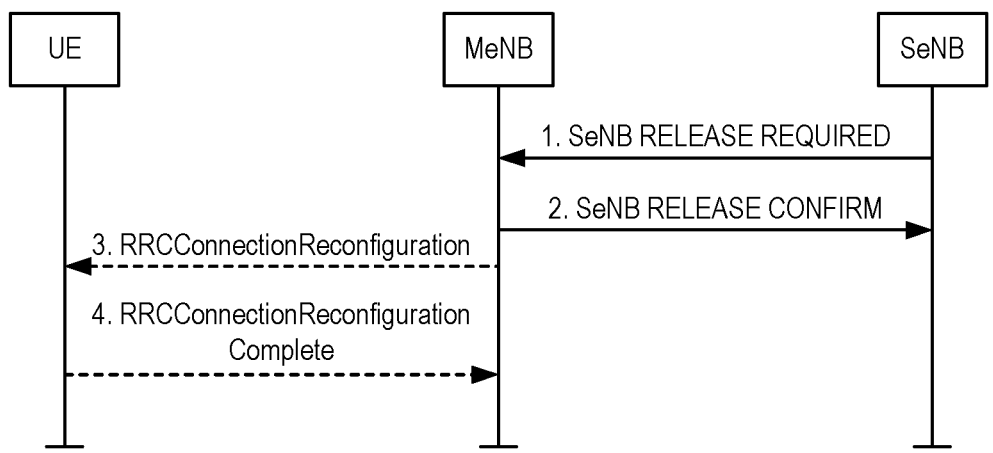

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The following definitions may apply:
"network procedures" may refer in particular to procedures such as release procedures and change procedures in a Dual Connectivity (DC) context, as described in the rest of the disclosure;
"first network node" and "second network node" may refer to a Master Node (MN) and a Secondary Node (SN), in a DC communication, such as described in the rest of the disclosure;
"rejection causes" may refer to a number of causes for which a network procedure initiated by a network node is rejected by another network node, with some particular examples described in the rest of the disclosure;
"a first set of conditions" may be used for a reject decision and "a second set of conditions" may be used for a confirm decision.

In 3GPP TSG-RAN WG2 NR Ad Hoc, the following agreements have been made:

Agreements:
1: For initial configuration of LTE/NR tight interworking, the measurement configuration used by the UE should be configured by the master node.
2: For the LTE/NR tight interworking, the intra-secondary node mobility (including Primary Secondary Cell (PS-Cell) change and Secondary Cell (SCell) release/addition) should be managed by the secondary node itself. At least in some cases, the master node needs to be informed of intra-secondary node mobility.
3: For the LTE/NR tight interworking, the measurement configuration used by the UE the intra-secondary node mobility should be managed by the secondary node. At least in some cases, coordination with the master is required.
4: Take the triggering of Cyclic Prefix (CP) procedure listed below as baseline for the LTE/NR tight interworking:
    Secondary Node Addition procedure: Triggered by master node.
    Secondary Node Release procedure: Triggered by both master node and secondary node.
    For Further Study (FFS) whether the secondary node or master node triggers change of secondary node.
    Intra-secondary node mobility: Triggered by secondary node.
    Addition/Release of SCell within secondary node: Triggered by secondary node.

In 3GPP TSG-RAN WG2#97bis, the following relevant agreements have been made:

Agreements:
1: Secondary Node Addition is used when there is no SN configured and is only initiated by the MN.
2: The recipient node of SN Release cannot reject the request.
3: Intra-SN mobility can trigger a SN modification request by the SN to MN.
FFS which scenarios require MN involvement and which don't.
4: For LTE-NR DC, MN handover can happen without SN node change.

Based on the current state of agreements, the Secondary Node Release procedure in case of Enhanced Universal Terrestrial Radio Access Network DC (EN-DC) may be initiated either by the Master eNB (MeNB) or by the Secondary gNB (SgNB) and is used to initiate the release of the UE context at the SgNB. It was also agreed that the recipient node of this request cannot reject it.

These proposed and/or agreed SgNB release procedures follow the same principles as in the corresponding LTE Secondary eNB (SeNB) release procedures. On the other hand, the potential scenarios for race conditions because some changes in the other EN-DC procedures are foreseen with respect to LTE DC, such as in the SgNB change procedure is considered herein.

If it is assumed that the SgNB cannot reject the release request in case of MeNB-initiated SgNB release, in some cases, ongoing SgNB change procedure can be interrupted e.g., a measurement report triggering SN change is received just before SgNB is received SgNB Release Request message.

Certain aspects of the present disclosure and their embodiments may provide solutions to these or other challenges.

The disclosure provides a set of embodiments to avoid a race condition between MeNB-initiated SgNB release and SgNB-initiated SgNB change procedures. Accordingly, SgNB should be able to reject MeNB-initiated SgNB Release Request if the request message is of a certain cause. The confirm/reject decision (from SgNB) is sent to MeNB via Xn (inter-node) signaling. Furthermore, this signal can also include a cause of reject to let MeNB know the root-cause of the reject, e.g., for future decisions on the MeNB side.

Some embodiments of the disclosure address ways in which a race condition between network procedures such as MeNB-initiated SgNB release and SgNB-initiated SgNB change procedures is avoided by SgNB rejecting a release request depending on the cause (i.e., the rejection cause) included within the SgNB Release Request message and how the SgNB can inform the MeNB of the cause of reject with a newly introduced reject.

There are, proposed herein, various embodiments which address one or more of the issues disclosed herein.

In one embodiment, a method performed by a second network node in a DC network communication for avoiding race condition between network procedures is provided, the method comprising: performing a reject decision to reject a network procedure initiated by a first network node under a first set of conditions; or performing a confirm decision to confirm a network procedure initiated by the first network node under a second set of conditions. Optionally, any one or more of the following apply:

1. One or more rejection causes allowing the second node to reject the network procedure are received by the second node, wherein, optionally, the one or more rejection causes may be included in a network procedure request to the second network node received from the first network node;
2. Wherein, optionally, the rejection causes may include one or more of: mobility, such as degrading condition or Radio Link Failure (RLF), or load balancing, or inactivity.

Optionally, the method further comprises sending the confirm/reject decision to the first node via inter-node signaling, such as Xn signaling. Optionally, information about the decision cause information is also sent to the first network node, either along with the decision or separately. The method may further comprise one or more of obtaining user data; and forwarding the user data to a host computer or a wireless device.

In another embodiment, a method performed by a wireless device for avoiding a race condition between network procedures is provided, the method comprising requesting a first network node, such as a master node in a DC network communication, to interrupt or revoke a release procedure. The method may further comprise the step of receiving from a second network node, such as a secondary node in the DC network communication, an indication that a mobility decision is interrupted by a request from the first network node. The method may further comprise one or more of providing user data; and forwarding the user data to a host computer via the transmission to a network node.

Devices, network nodes, computer programs, and computer media adapted to perform methods as described above are also provided.

Certain embodiments may provide one or more technical advantage(s). One such technical advantage is enabling the proactive resolution of a potential race condition between two network procedures such as EN-DC procedures. With such a resolution, a UE may seamlessly continue its service as well as mobility within 5G coverage. Also, unnecessary signaling and procedures (due to the race condition) can be avoided on the network side (as well as on the UE side since Radio Resource Control (RRC) reconfigurations would be minimized).

If it is assumed that the SgNB cannot reject the release request in case of MeNB-initiated SgNB release as in the conventional LTE procedures and as agreed in current 3GPP NR agreements, in some cases, ongoing SgNB change procedure can be interrupted. One of the scenarios for this race condition is that a measurement report triggering SN change is received by the SgNB just before the SgNB receives a SgNB Release Request message. In this case, the SgNB would be released before the SgNB mobility is performed completely, which would cause service interruption and/or degradation and unnecessary signaling between the networks nodes. Also, unnecessary signaling would be expected between the network node(s) and the UE due to expected multiple RRC reconfigurations to release the old SgNB and add a new SgNB with a series of procedures, namely, a SgNB release procedure and a SgNB addition procedure. Thus, in this disclosure, a set of embodiments to avoid this race condition between MeNB-initiated SgNB release and SgNB-initiated SgNB change procedures is proposed.

Figure 13:
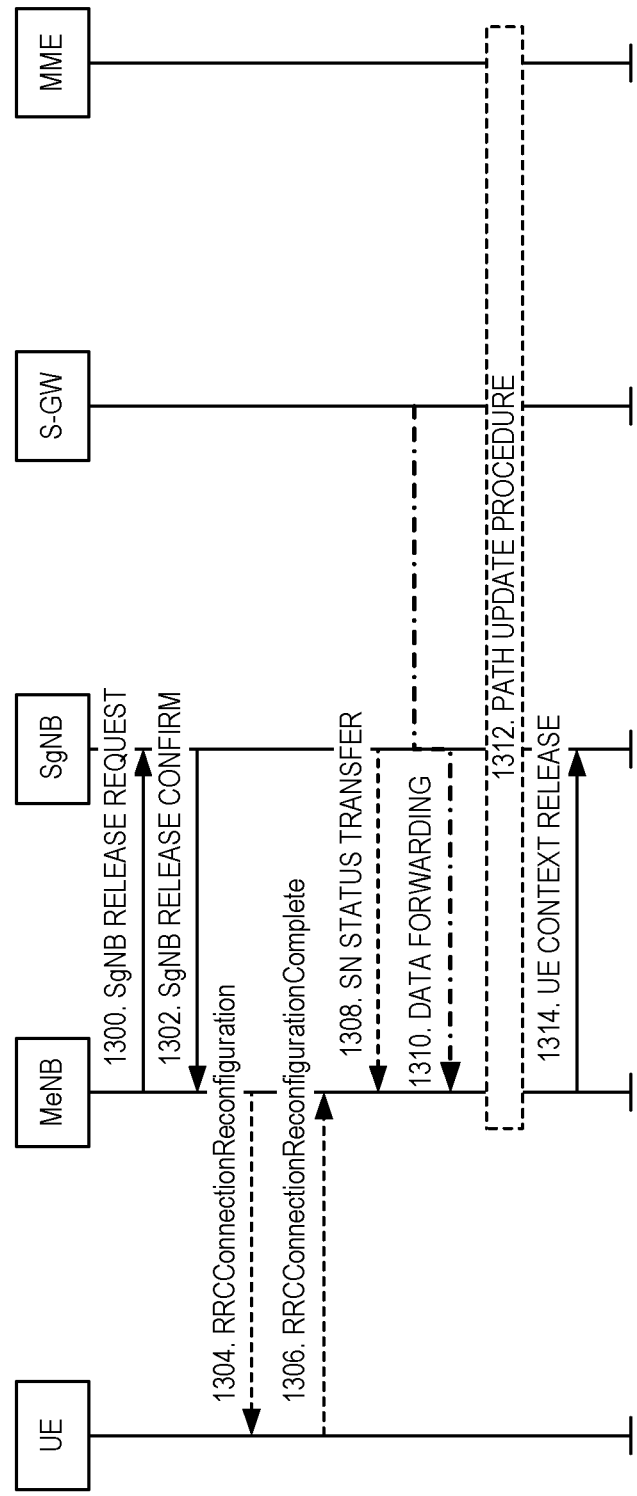

FIGS. 13 and 14 illustrate the operation of a MN and a SN in a DC communication in a wireless communication system to provide SN release in such a manner as to avoiding a race condition between network procedures in accordance with some embodiments of the present disclosure. In this example, the MN is a MeNB and the SN is a SgNB. However, as described herein, the present disclosure is not limited thereto.

FIG. 13 illustrates an example in which the SgNB decides to accept the SgNB Release Request. As illustrated, the MeNB sends a SgNB Release Request to the SgNB (step 1300). As described below, in some embodiments, the SgNB Release Request includes an indication of a cause of the SgNB Release Request, e.g., in the form of a cause Information Element (IE). Upon receiving the SgNB Release Request, the SgNB decides whether to accept or reject the SgNB Release Request. As discussed below, in some embodiments, this decision is based on the cause of the SgNB Release Request, which may be indicated in the SgNB Release Request. For example, one or more causes for which the SgNB may reject a SgNB Release Request may be predefined or preconfigured. As another example, one or more causes for which the SgNB may not reject a SgNB Release Request may be predefined or preconfigured. In this example, the SgNB decides to accept the SgNB Release Request and, as such, sends a SgNB Release Confirm message to the MeNB (step 1302). The SgNB release procedure then continues, e.g., in the conventional manner (steps 1304 through 1314).

FIG. 14 illustrates an example in which the SgNB decides to reject the SgNB Release Request. As illustrated, the MeNB sends a SgNB Release Request to the SgNB (step 1400). As described below, in some embodiments, the SgNB Release Request includes an indication of a cause of the SgNB Release Request, e.g., in the form of a cause IE. Upon receiving the SgNB Release Request, the SgNB decides whether to accept or reject the SgNB Release Request. As discussed below, in some embodiments, this decision is based on the cause of the SgNB Release Request, which may be indicated in the SgNB Release Request. For example, one or more causes for which the SgNB may reject a SgNB Release Request may be predefined or preconfigured. As another example, one or more causes for which the SgNB may not reject a SgNB Release Request may be predefined or preconfigured. In this example, the SgNB decides to reject the SgNB Release Request and, as such, sends a SgNB Release Reject message to the MeNB (step 1402). As discussed herein, in some embodiments, the SgNB Release Reject message includes an indication of a cause of the reject, e.g., in the form of a cause IE.

In the first embodiment, the SgNB is able to reject the MeNB-initiated SgNB Release Request provided that one of the causes included within the SgNB Release Request message allows the SgNB to reject the decision. In this embodiment, the SgNB is not always allowed to reject the SgNB Release Request even if there is an ongoing SgNB-initiated SgNB change procedure; or a measurement report, which triggers the SgNB-initiated SgNB change procedure, is received by the SgNB. That is because the MeNB may be releasing the SgNB for a reason other than radio conditions, such as due to inactivity on the NR side or traffic-steering/load balancing.

In one of the embodiments, the cause included in the MeNB-initiated SgNB Release Request that allows the SgNB to reject the decision is the mobility, i.e., degrading radio condition on the NR side or RLF on the NR side. On the other hand, in this embodiment, if the cause included in the request message is load balancing or inactivity, the SgNB would have to confirm the release. In other embodiments, causes for which the SgNB may reject the request may vary.

In some embodiments, inclusion of the cause IE in the MeNB-initiated SgNB Release Request may be always mandatory. In others, it could be only mandatory if the cause IE includes a cause which allows the SgNB to reject the decision (if necessary).

In some embodiments, the confirm/reject decision from the SgNB is sent to the MeNB via Xn (inter-node) signaling as shown in FIGS. 13 and 14.

In another embodiment, this Xn message, SgNB Release (Request) Reject/Confirm can also include a cause IE which indicates the cause of reject to help MeNB to understand the root cause of the reject decision and take necessary actions for a future decision on the MeNB side. For instance, the cause of reject could be an initiated/ongoing SgNB-initiated SgNB change procedure.

In yet another embodiment, the UE may request the MeNB to interrupt/revoke the release procedure via an MeNB RRC message provided that the SgNB has informed the UE that an ongoing SgNB mobility decision is interrupted by the MeNB Release Request. This embodiment is illustrated in FIG. 15.

In some embodiments, the MeNB and SgNB can be replaced by a Master gNB (MgNB) and a SeNB respectively.

As discussed above, when using convention procedures, the SN cannot reject SN release request. However, this may cause race conditions since the SN and MN can initiate parallel mobility procedures. One example for this is in case SN release is initiated by the MN, e.g., due to mobility while the SN is to trigger SN change as discussed above. However, this is not the only case where a race condition may happen. The race conditions may also occur in case of MN-initiated SN change, Inter-MN handover with/without SN change, and MN to eNB/gNB change; therefore, further solutions are desired to address precisely in which cases the SN should reject and should not reject as the decision of reject may not always be the preferred option.

Embodiments are described herein that minimize the disadvantages due to the ambiguity in a potential race condition between an MN-initiated procedure and an SN-initiated procedure. Accordingly, the SN should be able to reject or should accept/confirm SN Release Request sent by the MN depending on the cause indicated in the SN release message. The confirm/reject decision (from the SN) is sent to the MN via Xn (inter-node) signaling.

The proposed embodiments enable the optimal resolution of a potential race condition between EN-DC procedures. This way, the UE can, in the best way, continue its service as well as mobility within 5G coverage. Also, unnecessary signaling and procedures (due to the race condition) would be minimized on the network side (as well as on the UE side since RRC reconfigurations would be minimized).

The race conditions may occur in case of MN-initiated SN change, Inter-MN handover with/without SN change, and MB to eNB/gNB change. While in some cases a negative response, i.e., reject is preferable, in some cases a positive response, i.e., acknowledge/confirm could be optimal despite the fact that there is a race condition.

One of the embodiments refers to MN-initiated SN change. In this case, if the allocation of target SN resources was successful, the MN initiates the release of the source SN resources including a Cause indicating Secondary Cell Group (SCG) mobility in SN/SgNB Release Request. Then, the Source SN may reject the release. The relevant signaling is shown in FIG. 16.

Figure 4:
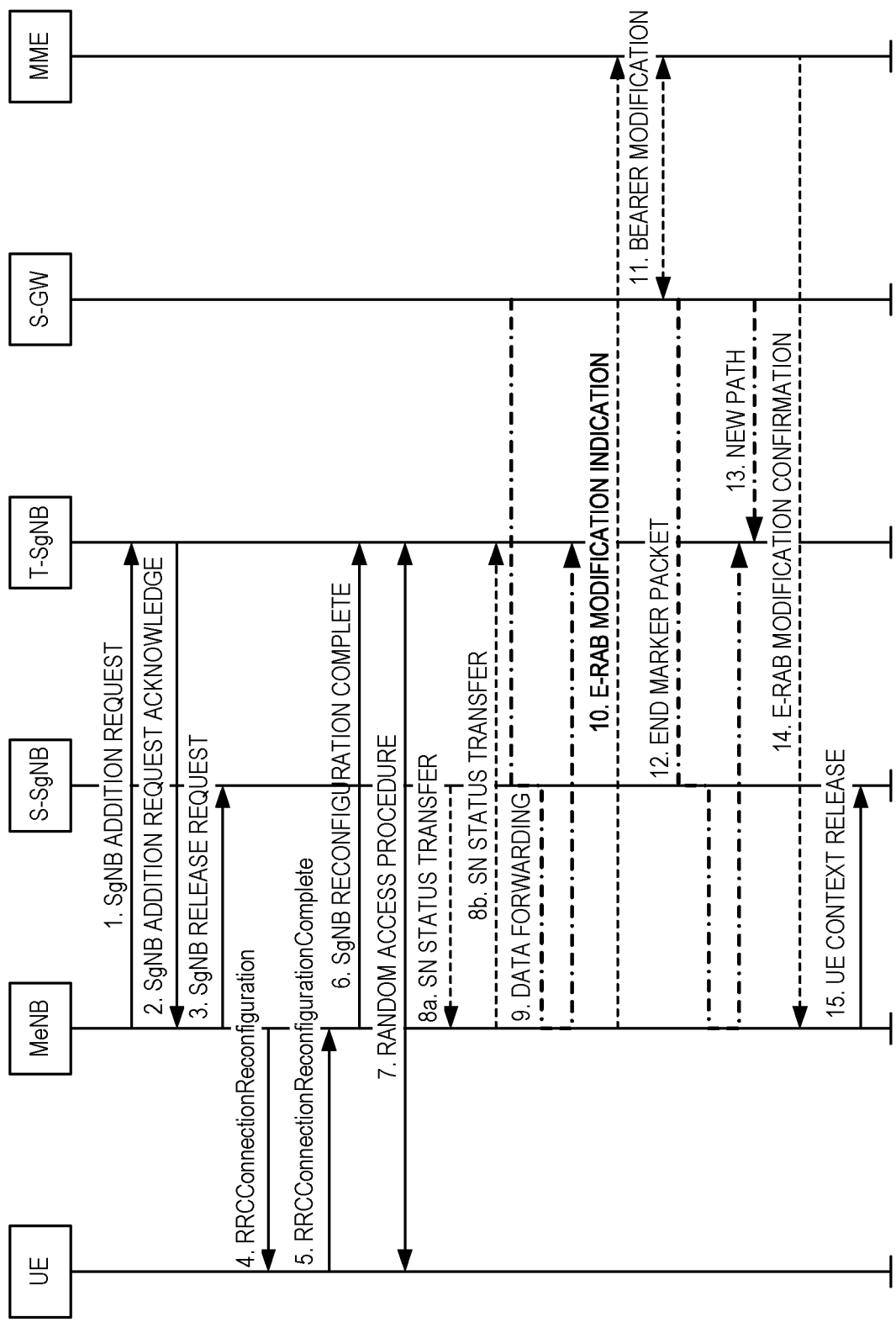
FIG. 4 shows an example signaling flow for Master Node (MN) initiated change of Secondary Node (SN) in the case of Enhanced Universal Terrestrial Radio Access Network Dual Connectivity (EN-DC)
Figure 5:
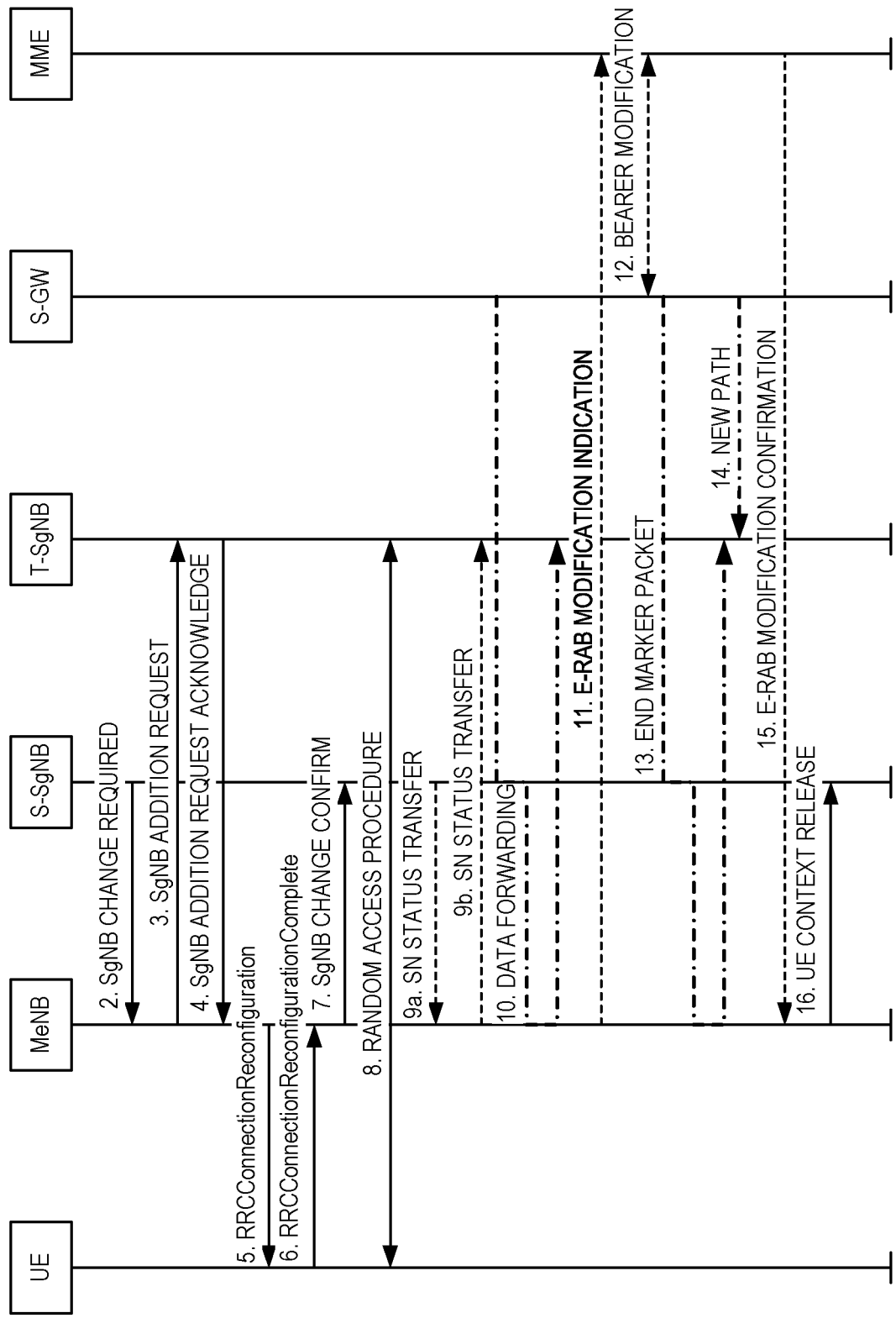
FIG. 5 shows an example signaling flow for the change of SN initiated by the SN in the case of EN-DC.
Figure 6:
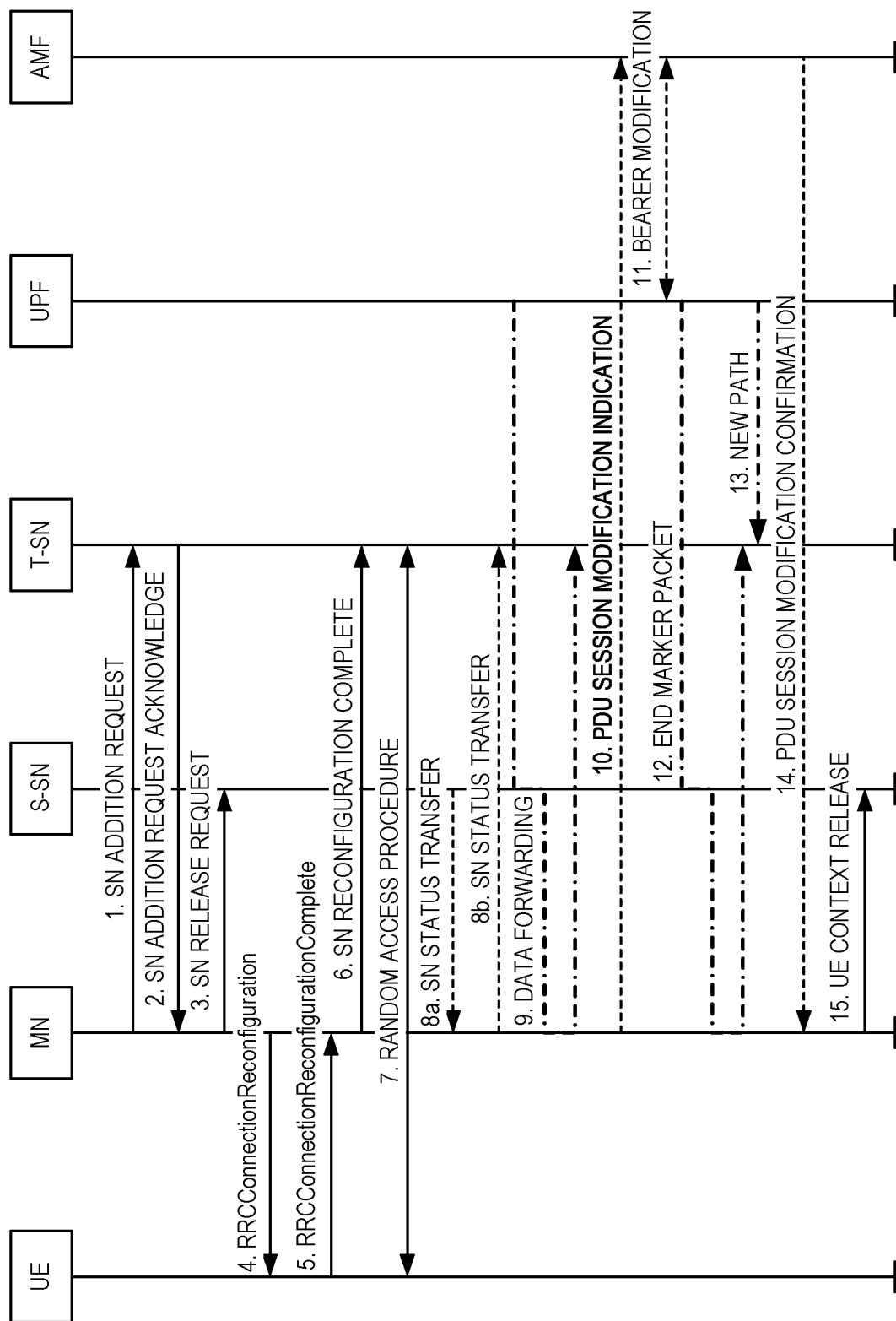
FIG. 6 shows an example signalling flow for the SN Change initiated by the MN in the case of Multi-Radio Access Technology Dual Connectivity (MR-DC)
Figure 7:
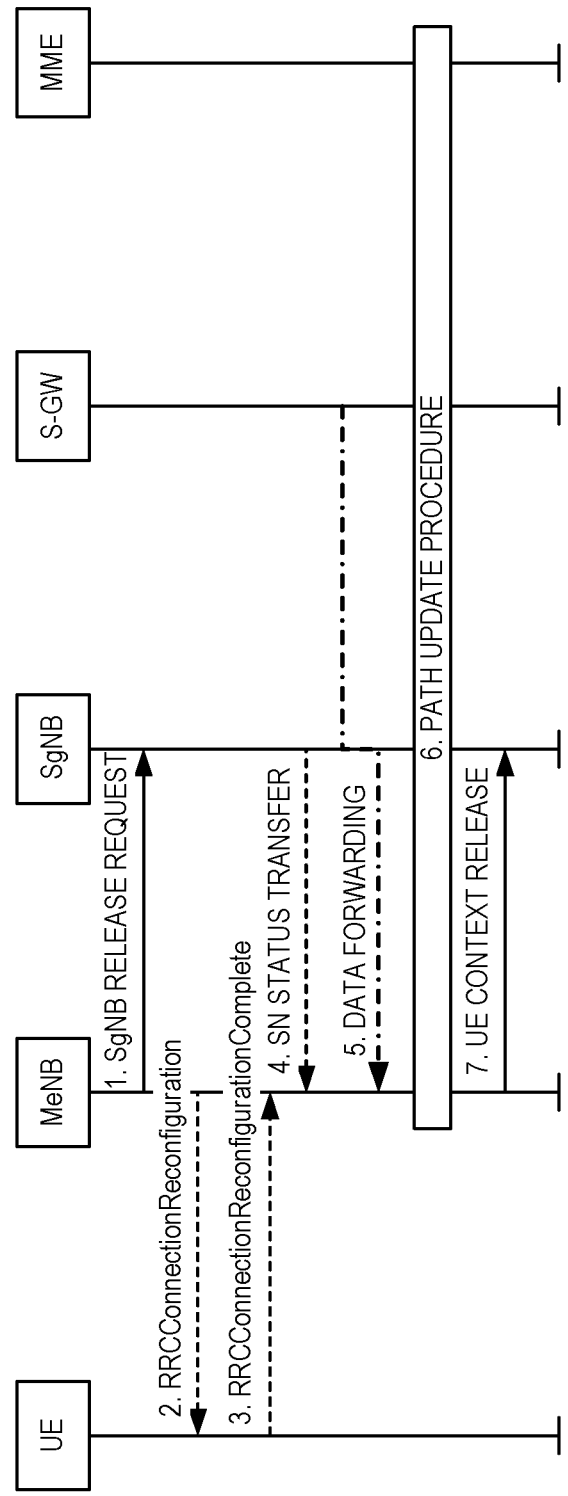
FIG. 7 shows an example signaling flow for the MN initiated SN Release procedure in the case of EN-DC.
Figure 8:
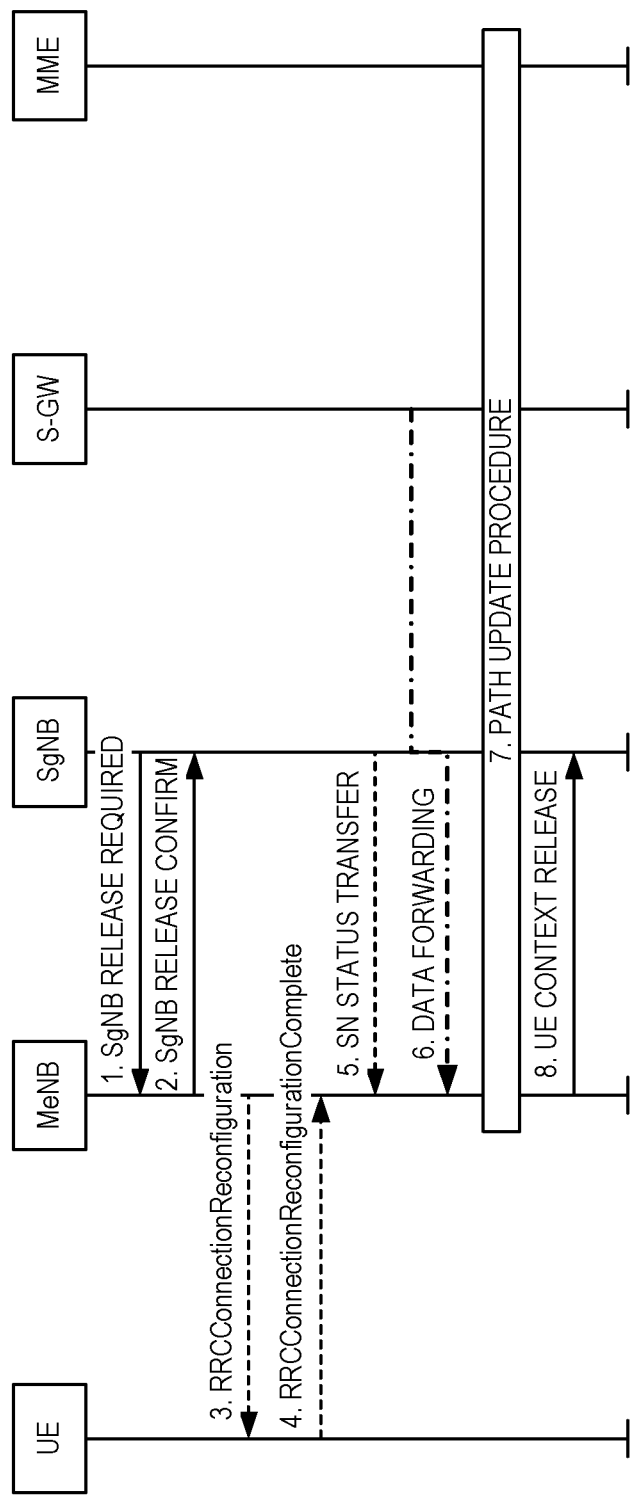
FIG. 8 shows an example signaling flow for the SN initiated SN Release procedure in the case of EN-DC.
Figure 9:
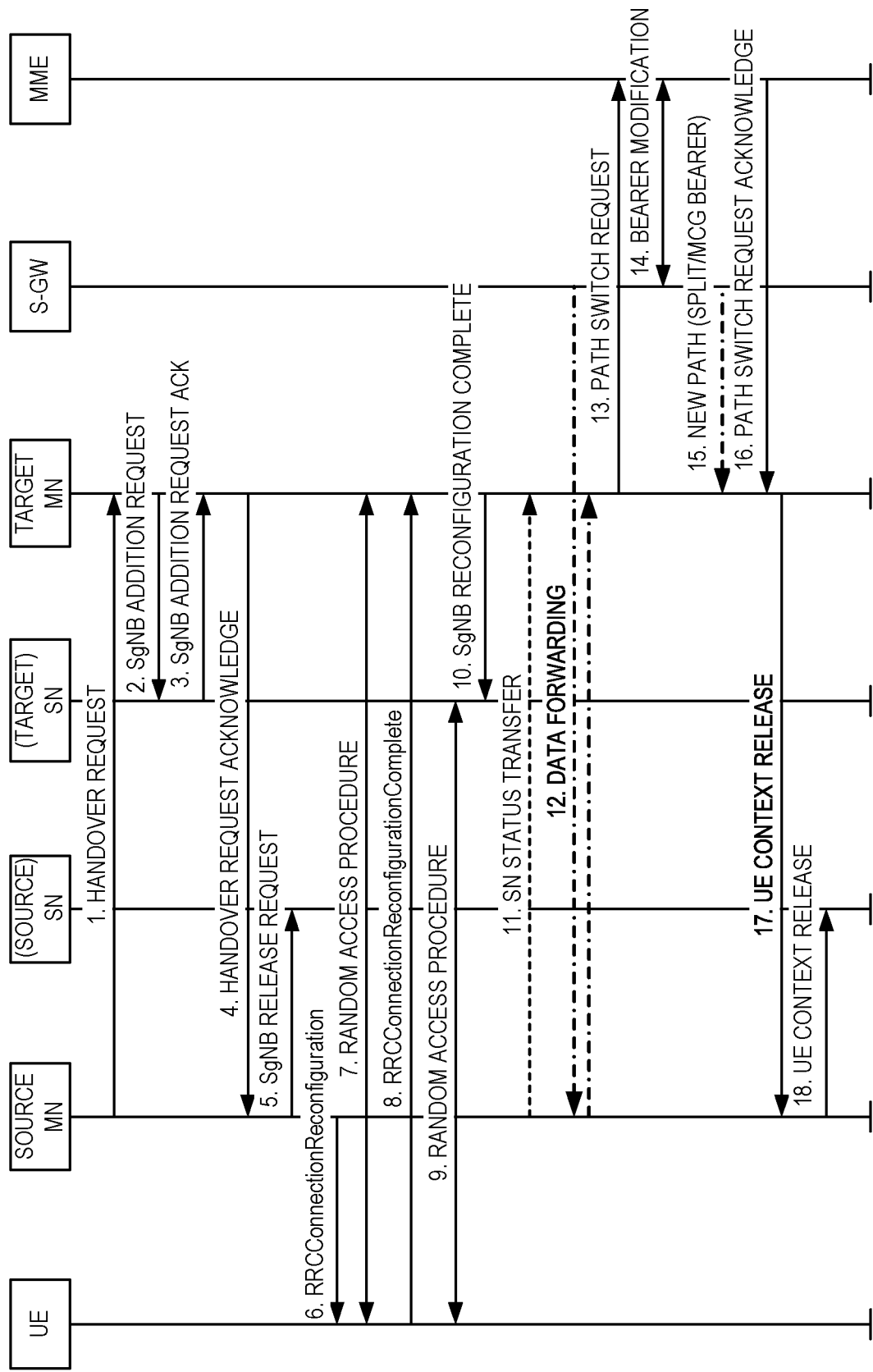
FIG. 9 shows an example signaling flow for inter-MN handover with or without MN initiated SN change in the case of EN-DC.
Figure 16:
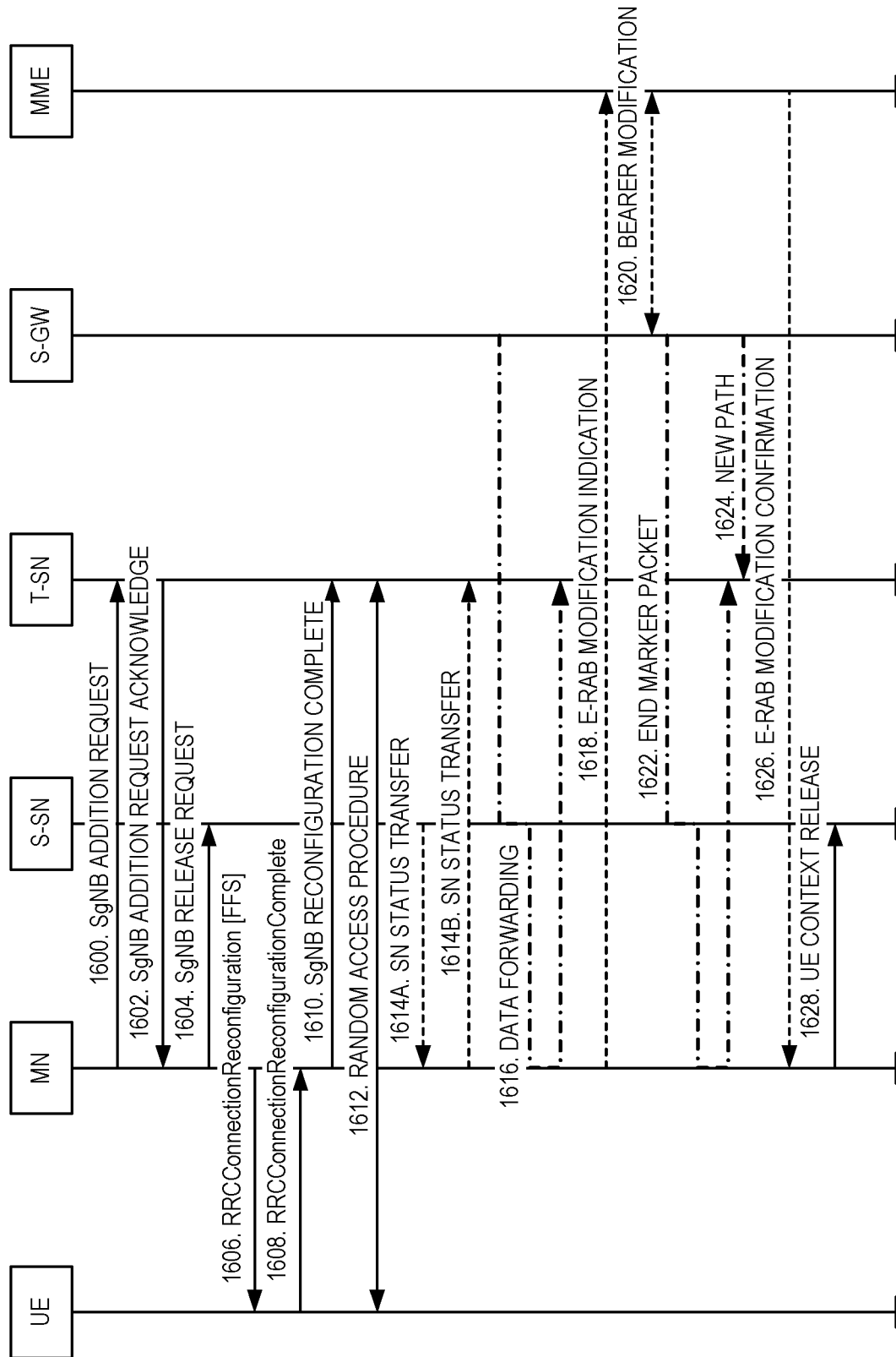
FIG. 16 illustrates an embodiment of a MN-initiated SN change in which, if the allocation of target SN resources was successful, the MN initiates the release of the source SN resources including a Cause indicating Secondary Cell Group (SCG) mobility in SN/SgNB Release Request and, then, the Source SN may reject the release.

The process of FIG. 16 is the same as that of FIG. 4 except that the Source SN may reject the release request.

Steps 1600 and 1602: The MeNB initiates the change of SgNB by requesting the target SgNB to allocate resources for the UE by means of the SgNB Addition procedure. The target SgNB responds with an acknowledge. If forwarding is needed, the target SgNB provides forwarding addresses to the MeNB.

Step 1604: If the allocation of target SgNB resources was successful, the MeNB initiates the release of the source SgNB resources. In this embodiment, the SgNB Release Request includes an indication of a cause of the SgNB Release Request, which in this example is SCG mobility. If data forwarding is needed, the MeNB provides data forwarding addresses to the source SgNB. Either direct data forwarding or indirect data forwarding is used for SCG bearer. Only indirect data forwarding is used for MCG Split bearer. Upon receiving the SgNB Release Request message, the SgNB decides whether to accept or reject the request based on the indicated cause. In this example, the cause is SCG mobility and, as such, the SgNB may reject the SgNB Release Request. As such, the SgNB can reject the SgNB Release Request. The SgNB sends a SgNB Release Acknowledge to the MeNB.

In this example, the SgNB accepts the SgNB Release Request and, as such, the procedure continues as described above with respect to FIG. 4.

Steps 1606 and 1608: The MeNB triggers the UE to apply the new configuration. The MeNB indicates to the UE the new configuration in the RRCConnectionReconfiguration message including the NR RRC configuration message generated by the target SgNB. The UE applies the new configuration and sends the RRCConnectionReconfigurationComplete message, including the encoded NR RRC response message for the target SgNB. In case the UE is unable to comply with (part of) the configuration included in the RRCConnectionReconfiguration message, it performs the reconfiguration failure procedure.

Step 1610: If the RRC connection reconfiguration procedure was successful, the MeNB informs the target SgNB via SgNBReconfigurationComplete message with the encoded NR RRC response message for the target SgNB.

Step 1612: The UE synchronizes to the target SeNB.

Steps 1614 and 1616: If applicable, data forwarding from the source SgNB takes place. It may be initiated as early as the source SgNB receives the SgNB Release Request message from the MeNB.

Steps 1618 through 1626: If one of the bearer contexts was configured with the SCG or SCG split bearer option at the source SgNB, path update is triggered by the MeNB.

Step 1628: Upon reception of the UE Context Release message, the source SgNB can release radio and C-plane related resource associated to the UE context. Any ongoing data forwarding may continue.

Another embodiment refers to Inter-MN handover with/without SN change. In this case, the source MN sends a SN Release Request to the (source) SN including a Cause indicating Master Cell Group (MCG) mobility in SN/SgNB Release Request. The (source) SN cannot reject the release request. The source MN indicates to the (source) SN that the UE context in SN is kept if it receives the indication from the target MN. If the indication as the UE context kept in SN is included, the SN keeps the UE context. The relevant signaling is shown in FIG. 17.

Figure 10:
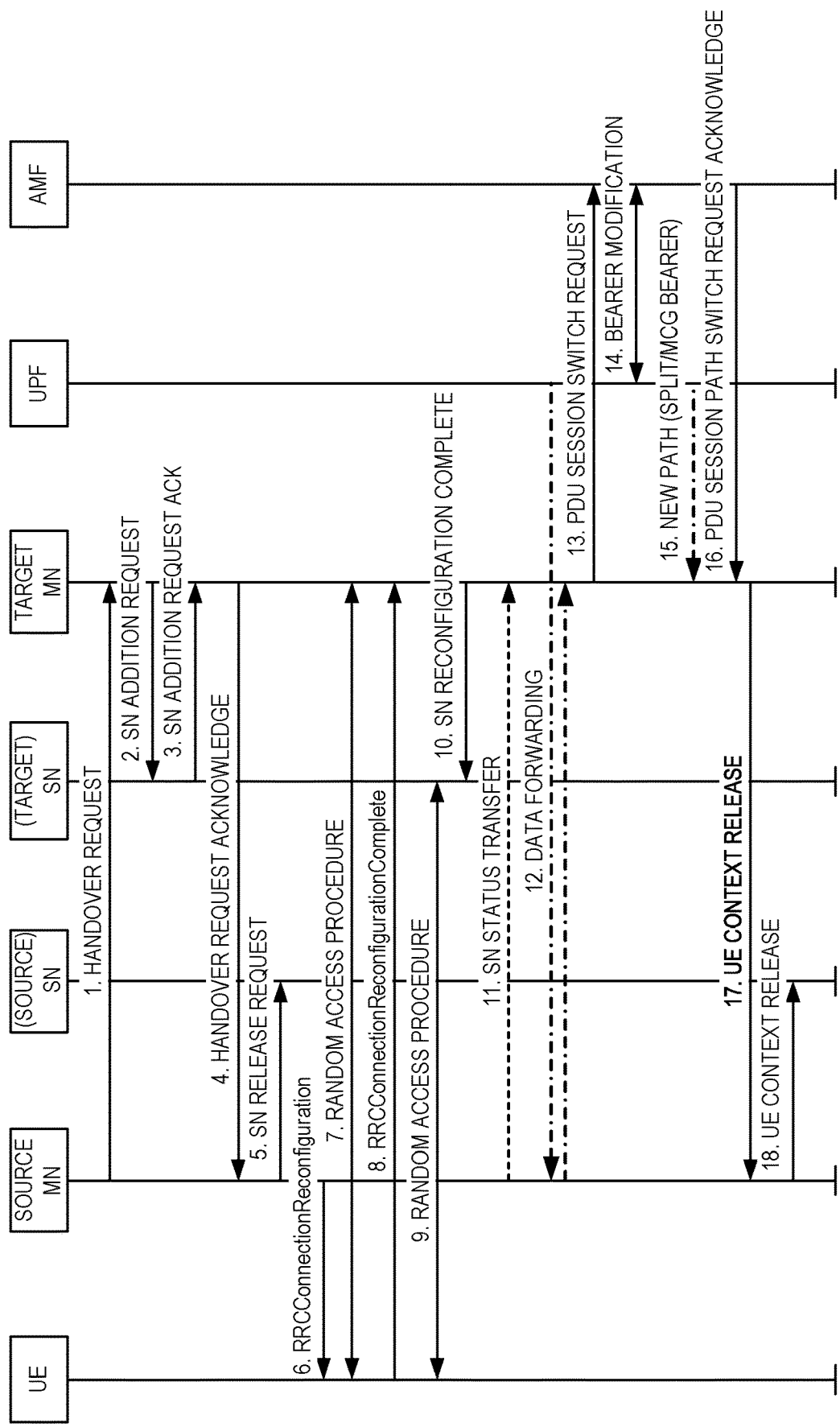
FIG. 10 shows an example signaling flow for inter-MN handover with or without MN initiated SN change in the case of MR-DC for Fifth Generation Core Network (5GC)
Figure 11:
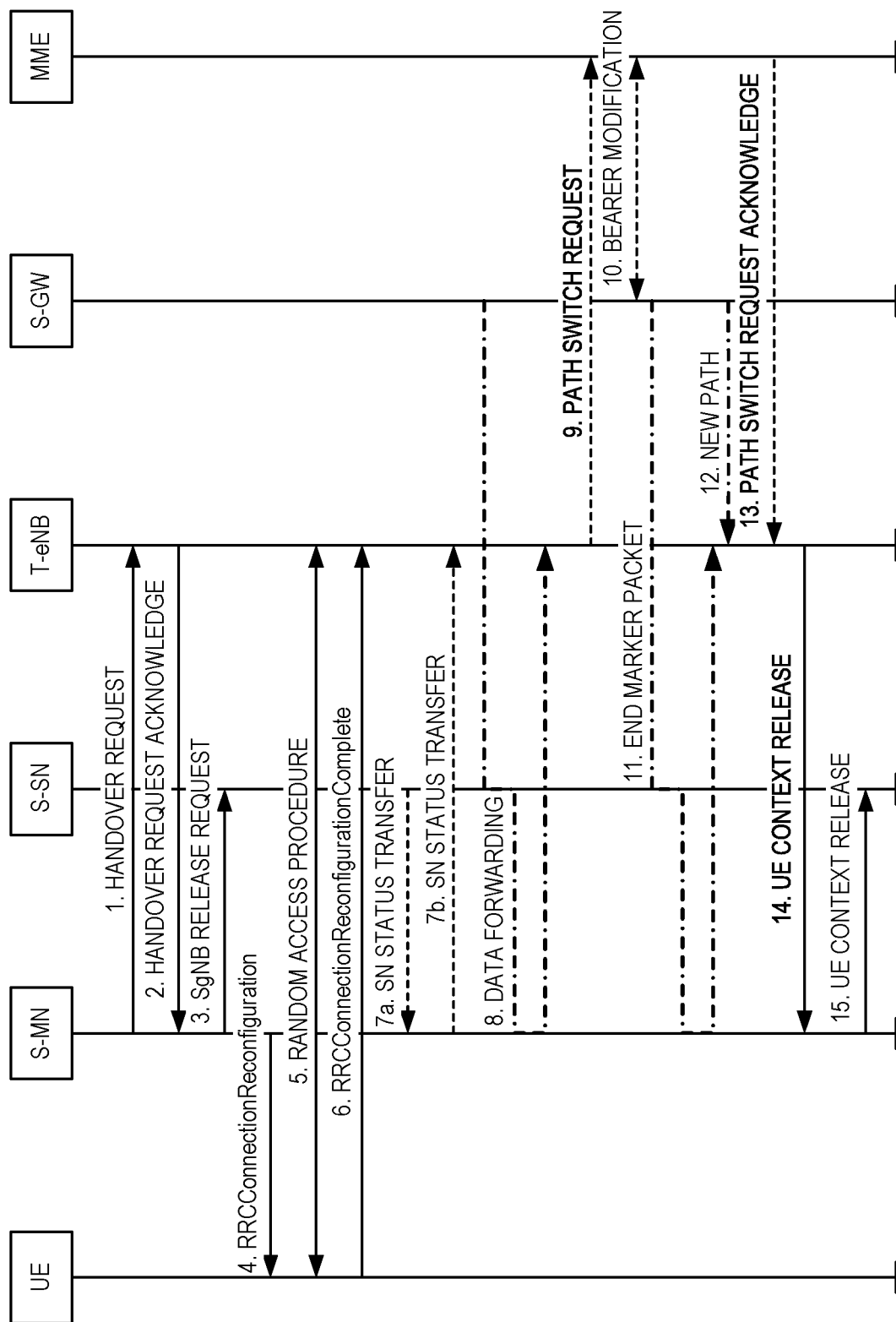
FIG. 11 shows an example signaling flow for the MN to enhanced or evolved Node B (eNB) Change procedure in the case of EN-DC.
Figure 17:
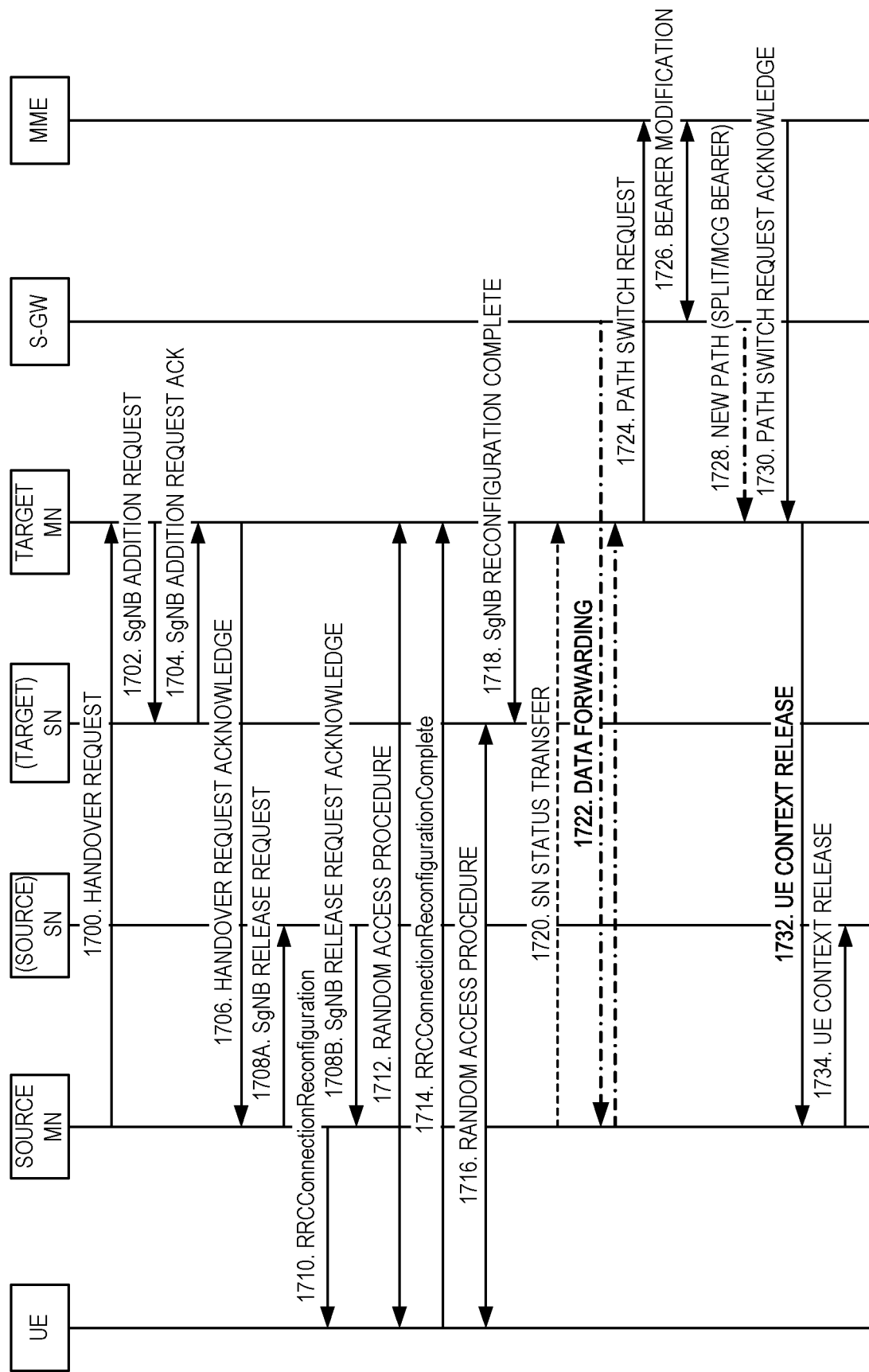
FIG. 17 illustrates a process that is the same as that of FIG. 10 except that the Source SN decides whether the release request can be rejected based on the cause indicated in the release request.

The process of FIG. 17 is the same as that of FIG. 10 except that the Source SN decides whether the release request can be rejected based on the cause indicated in the release request.

Step 1700: The source MN starts the handover procedure by initiating the Xn Handover Preparation procedure including both MCG and SCG configuration. The source MN includes the source SN UE XnAP Identifier (ID), SN ID, and the UE context in the source SN in the Handover Request message.

Step 1702: If the target MN decides to keep the source SN, the target MN sends SN Addition Request to the SN including the SN UE XnAP ID as a reference to the UE context in the SN that was established by the source MN. If the target MN decides to change the SN, the target MN sends the SN Addition Request to the target SN including the UE context in the source SN that was established by the source MN.

Step 1704: The (target) SN replies with SN Addition Request Acknowledge.

Step 1706: The target MN includes within the Handover Request Acknowledge message a transparent container to be sent to the UE as an RRC message to perform the handover, and may also provide forwarding addresses to the source MN. The target MN indicates to the source MN that the UE context in the SN is kept if the target MN and the SN decided to keep the UE context in the SN in step 1702 and step 1704.

Step 1708: The source MN sends SN Release Request message to the (source) SN. The SN Release Request includes an indication of the cause of the release request, which is, in this case, MCG mobility. The source MN indicates to the (source) SN that the UE context in SN is kept if it receives the indication from the target MN (assuming that the release is not rejected). If the indication as the UE context kept in SN is included, the SN keeps the UE context. Upon receiving the SN Release Request message, the (source) SN decides whether to accept or reject the SN Release Request. Here, since the cause of the release request is MCG mobility, the (source) SN node cannot reject the request. As such, the (source) SN decides (i.e., it must decide) that it is to accept the release request and, therefore, sends a SN Release Request acknowledge to the MN that indicates that the release was accepted.

Step 1710: The source MN triggers the UE to perform handover and apply the new configuration.

Steps 1712 and 1714: The UE synchronizes to the target MN and replies with MN RRC reconfiguration complete message.

Step 1716: The UE synchronizes to the (target) SN.

Step 1718: If the RRC connection reconfiguration procedure was successful, the target MN informs the (target) SN via SN Reconfiguration Complete message.

Steps 1720 and 1722: Data forwarding from the source MN takes place. If the SN is kept, data forwarding may be omitted for SCG bearers and SCG split bearers. Direct data forwarding from the source MN to the SN is not possible for MCG split bearers.

Steps 1724 through 1730: The target MN initiates the Protocol Data Unit (PDU) Session Path Switch procedure.

Step 1732: The target MN initiates the UE Context Release procedure towards the source MN.

Step 1734: Upon reception of the UE Context Release message from source MN, the (source) SN can release C-plane related resource associated to the UE context towards the source MN. Any ongoing data forwarding may continue. The SN shall not release the UE context associated with the target MN if the indication was included in the SN Release Request message in step 1708.

A further embodiment refers to MN to eNB/gNB Change. In this case, similarly to the previous embodiment, if the allocation of target eNB resources was successful, the MN initiates the release of the source SN resources towards the source SN including a Cause indicating MCG mobility. The SgNB cannot reject the release request. The relevant signaling is shown in FIG. 18.

Figure 12:
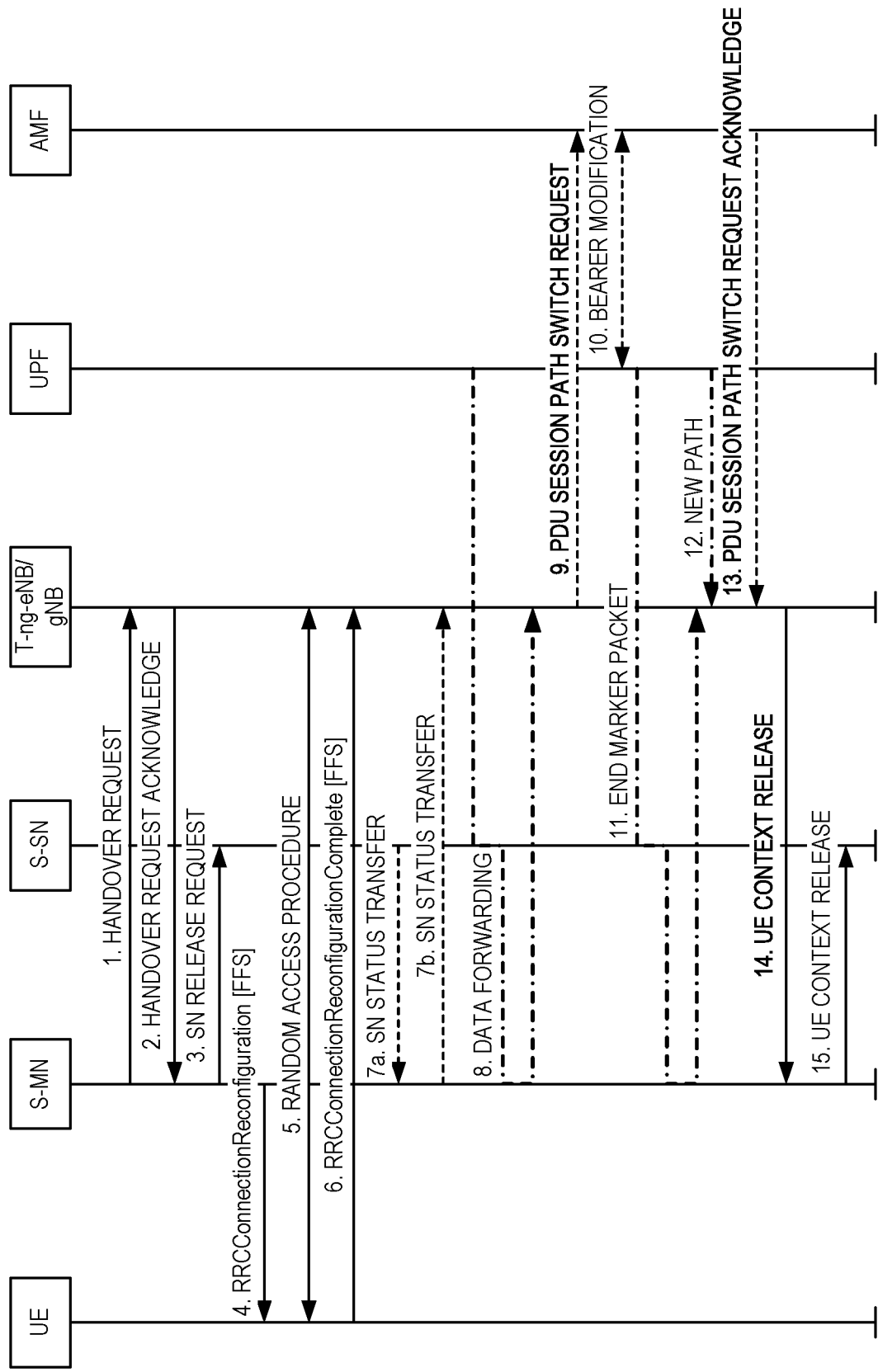
FIG. 12 shows an example signaling flow for the MN to Next Generation (NG) eNB/New Radio (NR) base station (gNB) Change procedure in the case of MR-DC for 5GC.
Figure 18:
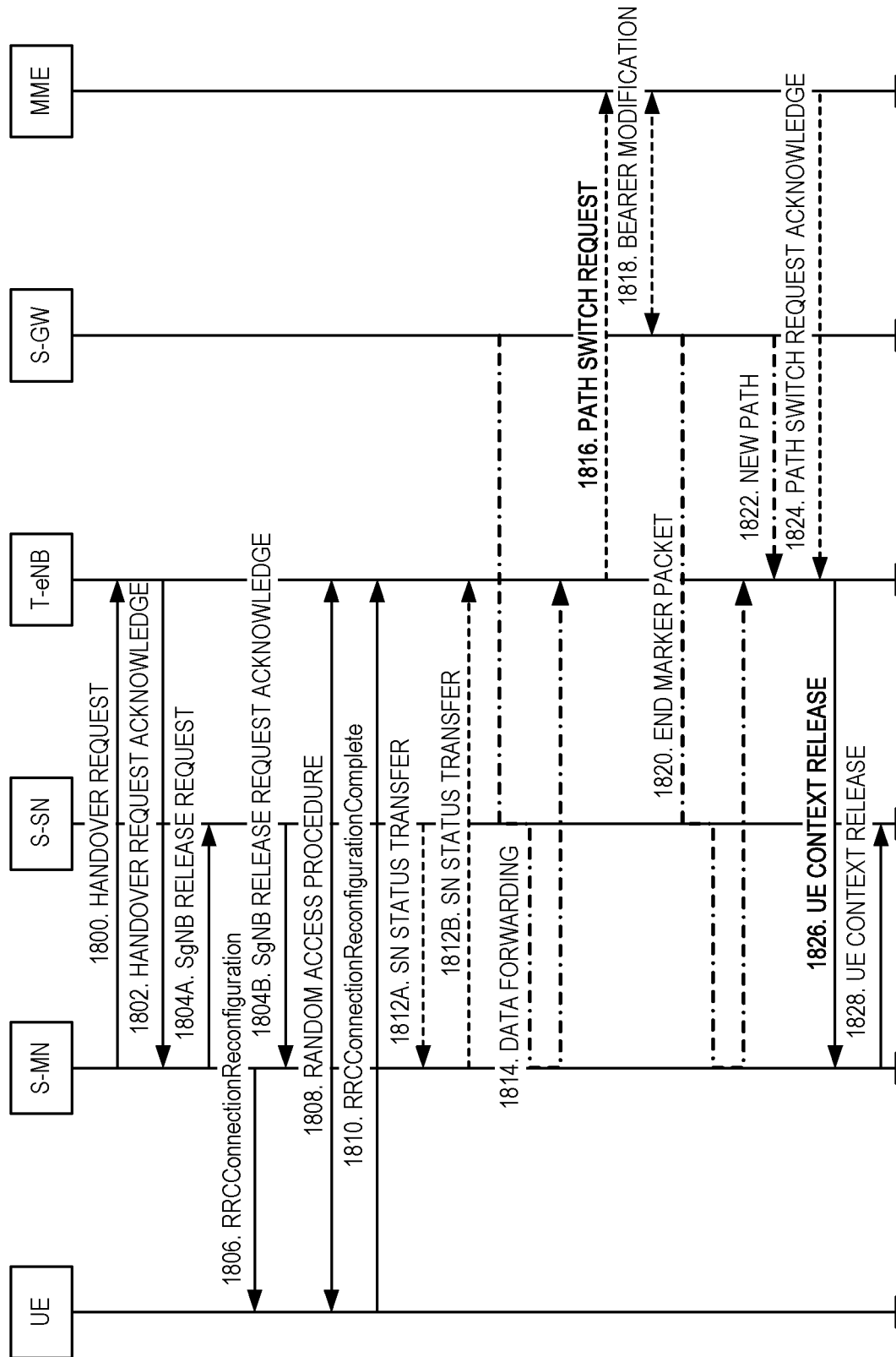
FIG. 18 illustrates a process that is the same as that of FIG. 12 except that the SN decides whether the release request can be rejected based on the cause indicated in the release request.

The process of FIG. 18 is the same as that of FIG. 12 except that the SN decides whether the release request can be rejected based on the cause indicated in the release request.

Step 1800: The source MN starts the MN to NG-eNB/gNB Change procedure by initiating the Xn Handover Preparation procedure, including both MCG and SCG configuration.

Step 1802: The target NG-eNB/gNB includes the field in HO command which releases the SCG configuration, and may also provide forwarding addresses to the source MN.

Step 1804: If the resource allocation of the target NG-eNB/gNB was successful, the MN initiates the release of the source SN resources towards the source SN including a Cause indicating MCG mobility. The SgNB cannot reject the release request. If data forwarding is needed, the MN provides data forwarding addresses to the source SN. Either direct data forwarding or indirect data forwarding is used for SCG bearers. Only indirect data forwarding is used for MCG Split bearers. Reception of the SN Release Request message triggers the source SN to stop providing user data to the UE and, if applicable, to start data forwarding. Upon receiving the SN Release Request message, the source SN decides whether to accept or reject the SN Release Request. Here, since the cause of the release request is MCG mobility, the source SN node cannot reject the request. As such, the source SN decides (i.e., it must decide) that it is to accept the release request and, therefore, sends a SN Release Request acknowledge to the MN that indicates that the release was accepted.

Step 1806: The MN triggers the UE to perform Handover (HO) and apply the new configuration. Upon receiving the new configuration, the UE releases the entire SCG configuration.

Steps 1808 and 1810: The UE synchronizes to the target NG-eNB/gNB.

Steps 1812 and 1814: If applicable, data forwarding from the source SN takes place. It may start as early as the source SN receives the SN Release Request message from the MN.

Steps 1816 through 1824: The target NG-eNB/gNB initiates the PDU

Session Path Switch procedure.

Step 1826: The target NG-eNB/gNB initiates the UE Context Release procedure towards the source MN.

Step 1828: Upon reception of the UE Context Release message from MN, the source SN can release radio and C-plane related resource associated to the UE context. Any ongoing data forwarding may continue.

In some embodiments, the solution can be generalized such that SN release request sent from the MN due to SCG mobility (e.g., trigger of SN change or SN release due to signal strength/quality change on the SN side) can be rejected by SN; whereas SN release sent from the MN due to MCG mobility has to be approved.

In some embodiments, as shown in the figures, SN/SgNB Release Request Acknowledgement is sent and the MN-initiated procedure resumes. Yet, in other embodiments, the MN-initiated procedure may fail/be terminated/be interrupted by a SN/SgNB Release Request Reject message. In this case, SN/SgNB Release Request Reject message may further include a Cause to reflect the reason of the negative response e.g., the race condition.

In some embodiments, the MN and SN can refer to the MeNB and SgNB and in some embodiments to the MgNB and SeNB respectively. In other embodiments, the MN and SN could be of the same radio access technology.

Embodiments are described above that minimize the disadvantages due to the ambiguity in a potential race condition between an MN-initiated procedure and an SN-initiated procedure. Accordingly, the SN should be able to reject/should confirm SN Release Request sent by the MN depending on the cause in the request message. The confirm/reject decision (from the SN) is sent to the MN via Xn (inter-node) signaling.

Figure 19:
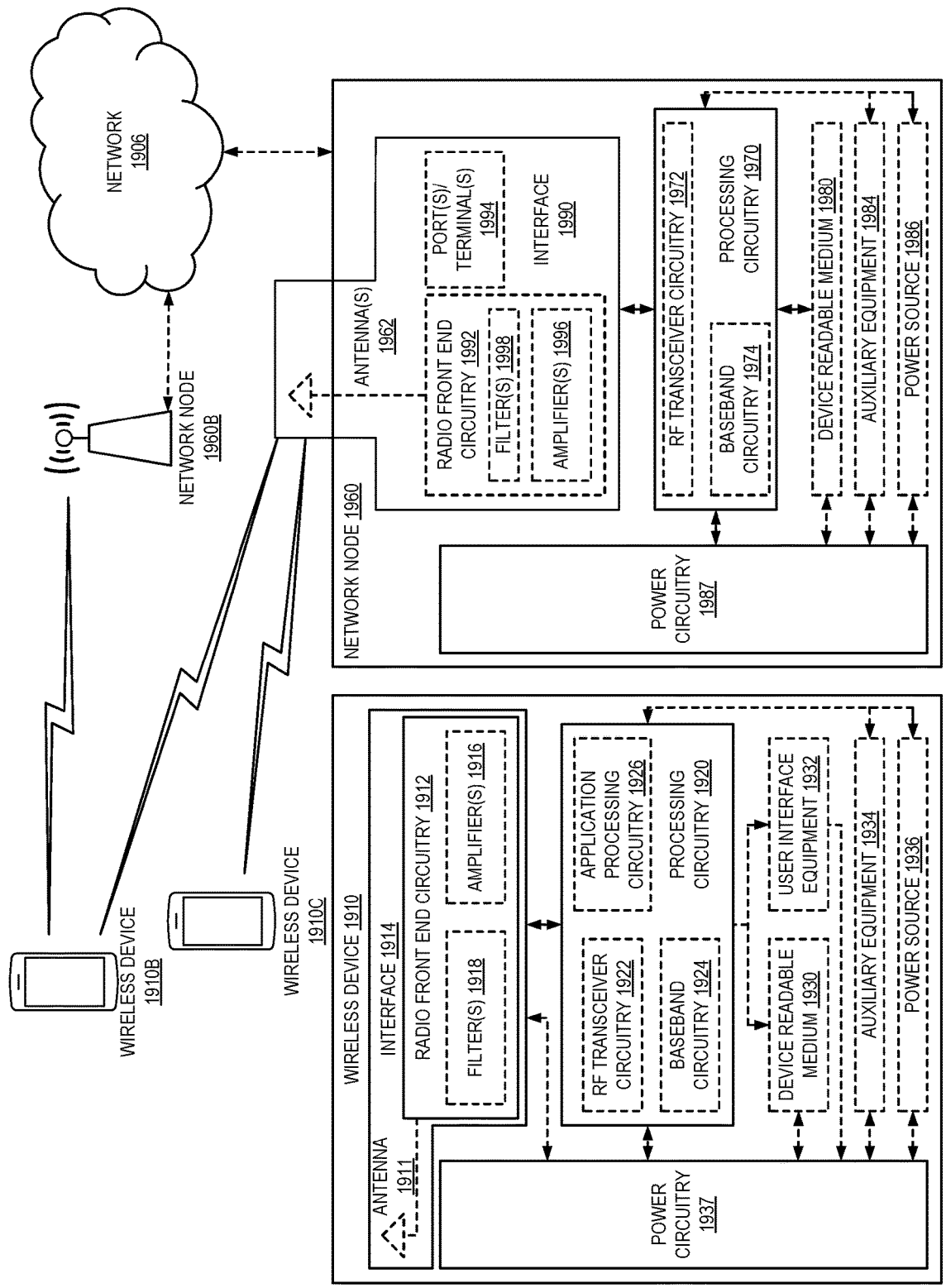
FIG. 19 illustrates one example of a wireless network according to some embodiments of the present disclosure.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts a network 1906, network nodes 1960 and 1960b, and Wireless Devices (WDs) 1910, 1910b, and 1910c. In practice, a wireless network may further include any additional elements suitable to support communication between wireless devices or between a wireless device and another communication device, such as a landline telephone, a service provider, or any other network node or end device. Of the illustrated components, the network node 1960 and WD 1910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 1906 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 1960 and the WD 1910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points) and Base Stations (BSs) (e.g., radio base stations, Node Bs, and eNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, the network node 1960 includes processing circuitry 1970, a device readable medium 1980, an interface 1990, auxiliary equipment 1984, a power source 1986, power circuitry 1987, and an antenna 1962. Although the network node 1960 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 1960 are depicted as single boxes located within a larger box, or nested within multiple boxes, in practice, a network node may comprise multiple different physical components that make up a single illustrated component (e.g., the device readable medium 1980 may comprise multiple separate hard drives as well as multiple Random Access Memory (RAM) modules).

Similarly, the network node 1960 may be composed of multiple physically separate components (e.g., a Node B component and a RNC component, or a BTS component and a BSC component, etc.), which may each have their own respective components. In certain scenarios in which the network node 1960 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1960 may be configured to support multiple Radio Access Technologies (RATs). In such embodiments, some components may be duplicated (e.g., a separate device readable medium 1980 for the different RATs) and some components may be reused (e.g., the same antenna 1962 may be shared by the RATs). The network node 1960 may also include multiple sets of the various illustrated components for different wireless technologies integrated into the network node 1960, such as, for example, GSM, Wideband Code Division Multiple Access (WCDMA), LTE, NR, WiFi, or Bluetooth wireless technologies. These wireless technologies may be integrated into the same or different chip or set of chips and other components within the network node 1960.

The processing circuitry 1970 is configured to perform any determining, calculating, or similar operations (e.g., certain obtaining operations) described herein as being provided by a network node. These operations performed by the processing circuitry 1970 may include processing information obtained by the processing circuitry 1970 by, for example, converting the obtained information into other information, comparing the obtained information or converted information to information stored in the network node 1960, and/or performing one or more operations based on the obtained information or converted information, and as a result of said processing making a determination.

The processing circuitry 1970 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software, and/or encoded logic operable to provide, either alone or in conjunction with other network node 1960 components, such as the device readable medium 1980, network node 1960 functionality. For example, the processing circuitry 1970 may execute instructions stored in the device readable medium 1980 or in memory within the processing circuitry 1970. Such functionality may include providing any of the various wireless features, functions, or benefits discussed herein. In some embodiments, the processing circuitry 1970 may include a System on a Chip (SOC).

In some embodiments, the processing circuitry 1970 may include one or more of Radio Frequency (RF) transceiver circuitry 1972 and baseband processing circuitry 1974. In some embodiments, the RF transceiver circuitry 1972 and the baseband processing circuitry 1974 may be on separate chips (or sets of chips), boards, or units, such as radio units and digital units. In alternative embodiments, part or all of the RF transceiver circuitry 1972 and the baseband processing circuitry 1974 may be on the same chip or set of chips, boards, or units.

In certain embodiments, some or all of the functionality described herein as being provided by a network node, base station, eNB, or other such network device may be performed by the processing circuitry 1970 executing instructions stored on the device readable medium 1980 or memory within the processing circuitry 1970. In alternative embodiments, some or all of the functionality may be provided by the processing circuitry 1970 without executing instructions stored on a separate or discrete device readable medium, such as in a hard-wired manner. In any of those embodiments, whether executing instructions stored on a device readable storage medium or not, the processing circuitry 1970 can be configured to perform the described functionality. The benefits provided by such functionality are not limited to the processing circuitry 1970 alone or to other components of the network node 1960, but are enjoyed by the network node 1960 as a whole, and/or by end users and the wireless network generally.

The device readable medium 1980 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1970. The device readable medium 1980 may store any suitable instructions, data, or information, including a computer program, software, an application including one or more of logic, rules, code, tables, etc., and/or other instructions capable of being executed by the processing circuitry 1970 and utilized by the network node 1960. The device readable medium 1980 may be used to store any calculations made by the processing circuitry 1970 and/or any data received via the interface 1990. In some embodiments, the processing circuitry 1970 and the device readable medium 1980 may be considered to be integrated.

The interface 1990 is used in the wired or wireless communication of signaling and/or data between the network node 1960, the network 1906, and/or the WDs 1910. As illustrated, the interface 1990 comprises port(s)/terminal(s) 1994 to send and receive data, for example to and from the network 1906 over a wired connection. The interface 1990 also includes radio front end circuitry 1992 that may be coupled to, or in certain embodiments a part of, the antenna 1962. The radio front end circuitry 1992 comprises filters 1998 and amplifiers 1996. The radio front end circuitry 1992 may be connected to the antenna 1962 and the processing circuitry 1970. The radio front end circuitry 1992 may be configured to condition signals communicated between the antenna 1962 and the processing circuitry 1970. The radio front end circuitry 1992 may receive digital data that is to be sent out to other network nodes or WDs via a wireless connection. The radio front end circuitry 1992 may convert the digital data into a radio signal having the appropriate channel and bandwidth parameters using a combination of the filters 1998 and/or the amplifiers 1996. The radio signal may then be transmitted via the antenna 1962. Similarly, when receiving data, the antenna 1962 may collect radio signals which are then converted into digital data by the radio front end circuitry 1992. The digital data may be passed to the processing circuitry 1970. In other embodiments, the interface may comprise different components and/or different combinations of components.

In certain alternative embodiments, the network node 1960 may not include separate radio front end circuitry 1992; instead, the processing circuitry 1970 may comprise radio front end circuitry and may be connected to the antenna 1962 without separate radio front end circuitry 1992. Similarly, in some embodiments, all or some of the RF transceiver circuitry 1972 may be considered a part of the interface 1990. In still other embodiments, the interface 1990 may include the one or more ports or terminals 1994, the radio front end circuitry 1992, and the RF transceiver circuitry 1972 as part of a radio unit (not shown), and the interface 1990 may communicate with the baseband processing circuitry 1974, which is part of a digital unit (not shown).

The antenna 1962 may include one or more antennas, or antenna arrays, configured to send and/or receive wireless signals. The antenna 1962 may be coupled to the radio front end circuitry 1992 and may be any type of antenna capable of transmitting and receiving data and/or signals wirelessly. In some embodiments, the antenna 1962 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 1962 may be separate from the network node 1960 and may be connectable to the network node 1960 through an interface or port.

The antenna 1962, the interface 1990, and/or the processing circuitry 1970 may be configured to perform any receiving operations and/or certain obtaining operations described herein as being performed by a network node. Any information, data, and/or signals may be received from a wireless device, another network node, and/or any other network equipment. Similarly, the antenna 1962, the interface 1990, and/or the processing circuitry 1970 may be configured to perform any transmitting operations described herein as being performed by a network node. Any information, data, and/or signals may be transmitted to a wireless device, another network node, and/or any other network equipment.

The power circuitry 1987 may comprise, or be coupled to, power management circuitry and is configured to supply the components of the network node 1960 with power for performing the functionality described herein. The power circuitry 1987 may receive power from a power source 1986. The power source 1986 and/or the power circuitry 1987 may be configured to provide power to the various components of the network node 1960 in a form suitable for the respective components (e.g., at a voltage and current level needed for each respective component). The power source 1986 may either be included in, or external to, the power circuitry 1987 and/or the network node 1960. For example, the network node 1960 may be connectable to an external power source (e.g., an electricity outlet) via input circuitry or an interface such as an electrical cable, whereby the external power source supplies power to the power circuitry 1987. As a further example, the power source 1986 may comprise a source of power in the form of a battery or battery pack which is connected to, or integrated in, the power circuitry 1987. The battery may provide backup power should the external power source fail. Other types of power sources, such as photovoltaic devices, may also be used.

Alternative embodiments of the network node 1960 may include additional components beyond those shown in FIG. 19 that may be responsible for providing certain aspects of the network node's functionality, including any of the functionality described herein and/or any functionality necessary to support the subject matter described herein. For example, the network node 1960 may include user interface equipment to allow input of information into the network node 1960 and to allow output of information from the network node 1960. This may allow a user to perform diagnostic, maintenance, repair, and other administrative functions for the network node 1960.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, a Laptop Embedded Equipment (LEE), a Laptop Mounted Equipment (LME), a smart device, a wireless Customer Premise Equipment (CPE) a vehicle-mounted wireless terminal device, etc. A WD may support Device-to-Device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a Machine-to-Machine (M2M) device, which may in a 3GPP context be referred to as a MTC device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, the wireless device 1910 includes an antenna 1911, an interface 1914, processing circuitry 1920, a device readable medium 1930, user interface equipment 1932, auxiliary equipment 1934, a power source 1936, and power circuitry 1937. The WD 1910 may include multiple sets of one or more of the illustrated components for different wireless technologies supported by the WD 1910, such as, for example, GSM, WCDMA, LTE, NR, WiFi, WiMAX, or Bluetooth wireless technologies, just to mention a few. These wireless technologies may be integrated into the same or different chips or set of chips as other components within the WD 1910.

The antenna 1911 may include one or more antennas or antenna arrays configured to send and/or receive wireless signals and is connected to the interface 1914. In certain alternative embodiments, the antenna 1911 may be separate from the WD 1910 and be connectable to the WD 1910 through an interface or port. The antenna 1911, the interface 1914, and/or the processing circuitry 1920 may be configured to perform any receiving or transmitting operations described herein as being performed by a WD. Any information, data, and/or signals may be received from a network node and/or another WD. In some embodiments, radio front end circuitry and/or the antenna 1911 may be considered an interface.

As illustrated, the interface 1914 comprises radio front end circuitry 1912 and the antenna 1911. The radio front end circuitry 1912 comprises one or more filters 1918 and amplifiers 1916. The radio front end circuitry 1914 is connected to the antenna 1911 and the processing circuitry 1920, and is configured to condition signals communicated between the antenna 1911 and the processing circuitry 1920. The radio front end circuitry 1912 may be coupled to or a part of the antenna 1911. In some embodiments, the WD 1910 may not include separate radio front end circuitry 1912; rather, the processing circuitry 1920 may comprise radio front end circuitry and may be connected to the antenna 1911. Similarly, in some embodiments, some or all of RF transceiver circuitry 1922 may be considered a part of the interface 1914. The radio front end circuitry 1912 may receive digital data that is to be sent out to other network nodes or WDs via a wireless connection. The radio front end circuitry 1912 may convert the digital data into a radio signal having the appropriate channel and bandwidth parameters using a combination of the filters 1918 and/or the amplifiers 1916. The radio signal may then be transmitted via the antenna 1911. Similarly, when receiving data, the antenna 1911 may collect radio signals which are then converted into digital data by the radio front end circuitry 1912. The digital data may be passed to the processing circuitry 1920. In other embodiments, the interface 1914 may comprise different components and/or different combinations of components.

The processing circuitry 1920 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD 1910 components, such as the device readable medium 1930, WD 1910 functionality. Such functionality may include providing any of the various wireless features or benefits discussed herein. For example, the processing circuitry 1920 may execute instructions stored in the device readable medium 1930 or in memory within the processing circuitry 1920 to provide the functionality disclosed herein.

As illustrated, the processing circuitry 1920 includes one or more of the RF transceiver circuitry 1922, baseband processing circuitry 1924, and application processing circuitry 1926. In other embodiments, the processing circuitry may comprise different components and/or different combinations of components. In certain embodiments the processing circuitry 1920 of the WD 1910 may comprise a SOC. In some embodiments, the RF transceiver circuitry 1922, the baseband processing circuitry 1924, and the application processing circuitry 1926 may be on separate chips or sets of chips. In alternative embodiments, part or all of the baseband processing circuitry 1924 and the application processing circuitry 1926 may be combined into one chip or set of chips, and the RF transceiver circuitry 1922 may be on a separate chip or set of chips. In still alternative embodiments, part or all of the RF transceiver circuitry 1922 and the baseband processing circuitry 1924 may be on the same chip or set of chips, and the application processing circuitry 1926 may be on a separate chip or set of chips. In yet other alternative embodiments, part or all of the RF transceiver circuitry 1922, the baseband processing circuitry 1924, and the application processing circuitry 1926 may be combined in the same chip or set of chips. In some embodiments, the RF transceiver circuitry 1922 may be a part of the interface 1914. The RF transceiver circuitry 1922 may condition RF signals for the processing circuitry 1920.

In certain embodiments, some or all of the functionality described herein as being performed by a WD may be provided by the processing circuitry 1920 executing instructions stored on the device readable medium 1930, which in certain embodiments may be a computer-readable storage medium. In alternative embodiments, some or all of the functionality may be provided by the processing circuitry 1920 without executing instructions stored on a separate or discrete device readable storage medium, such as in a hard-wired manner. In any of those particular embodiments, whether executing instructions stored on a device readable storage medium or not, the processing circuitry 1920 can be configured to perform the described functionality. The benefits provided by such functionality are not limited to the processing circuitry 1920 alone or to other components of the WD 1910, but are enjoyed by the WD 1910 as a whole, and/or by end users and the wireless network generally.

The processing circuitry 1920 may be configured to perform any determining, calculating, or similar operations (e.g., certain obtaining operations) described herein as being performed by a WD. These operations, as performed by the processing circuitry 1920, may include processing information obtained by the processing circuitry 1920 by, for example, converting the obtained information into other information, comparing the obtained information or converted information to information stored by the WD 1910, and/or performing one or more operations based on the obtained information or converted information, and as a result of said processing making a determination.

The device readable medium 1930 may be operable to store a computer program, software, an application including one or more of logic, rules, code, tables, etc., and/or other instructions capable of being executed by the processing circuitry 1920. The device readable medium 1930 may include computer memory (e.g., RAM or ROM), mass storage media (e.g., a hard disk), removable storage media (e.g., a CD or a DVD), and/or any other volatile or non-volatile, non-transitory device readable, and/or computer executable memory devices that store information, data, and/or instructions that may be used by the processing circuitry 1920. In some embodiments, the processing circuitry 1920 and the device readable medium 1930 may be considered to be integrated.

The user interface equipment 1932 may provide components that allow for a human user to interact with the WD 1910. Such interaction may be of many forms, such as visual, audial, tactile, etc. The user interface equipment 1932 may be operable to produce output to the user and to allow the user to provide input to the WD 1910. The type of interaction may vary depending on the type of the user interface equipment 1932 installed in the WD 1910. For example, if the WD 1910 is a smart phone, the interaction may be via a touch screen; if the WD 1910 is a smart meter, the interaction may be through a screen that provides usage (e.g., the number of gallons used) or a speaker that provides an audible alert (e.g., if smoke is detected). The user interface equipment 1932 may include input interfaces, devices and circuits, and output interfaces, devices, and circuits. The user interface equipment 1932 is configured to allow input of information into the WD 1910, and is connected to the processing circuitry 1920 to allow the processing circuitry 1920 to process the input information. The user interface equipment 1932 may include, for example, a microphone, a proximity or other sensor, keys/buttons, a touch display, one or more cameras, a Universal Serial Bus (USB) port, or other input circuitry. The user interface equipment 1932 is also configured to allow output of information from the WD 1910, and to allow the processing circuitry 1920 to output information from the WD 1910. The user interface equipment 1932 may include, for example, a speaker, a display, vibrating circuitry, a USB port, a headphone interface, or other output circuitry. Using one or more input and output interfaces, devices, and circuits of the user interface equipment 1932, the WD 1910 may communicate with end users and/or the wireless network and allow them to benefit from the functionality described herein.

The auxiliary equipment 1934 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 1934 may vary depending on the embodiment and/or scenario.

The power source 1936 may, in some embodiments, be in the form of a battery or battery pack. Other types of power sources, such as an external power source (e.g., an electricity outlet), photovoltaic devices, or power cells may also be used. The WD 1910 may further comprise the power circuitry 1937 for delivering power from the power source 1936 to the various parts of the WD 1910 which need power from the power source 1936 to carry out any functionality described or indicated herein. The power circuitry 1937 may in certain embodiments comprise power management circuitry. The power circuitry 1937 may additionally or alternatively be operable to receive power from an external power source; in which case the WD 1910 may be connectable to the external power source (such as an electricity outlet) via input circuitry or an interface such as an electrical power cable. The power circuitry 1937 may also in certain embodiments be operable to deliver power from an external power source to the power source 1936. This may be, for example, for the charging of the power source 1936. The power circuitry 1937 may perform any formatting, converting, or other modification to the power from the power source 1936 to make the power suitable for the respective components of the WD 1910 to which power is supplied.

Figure 20:
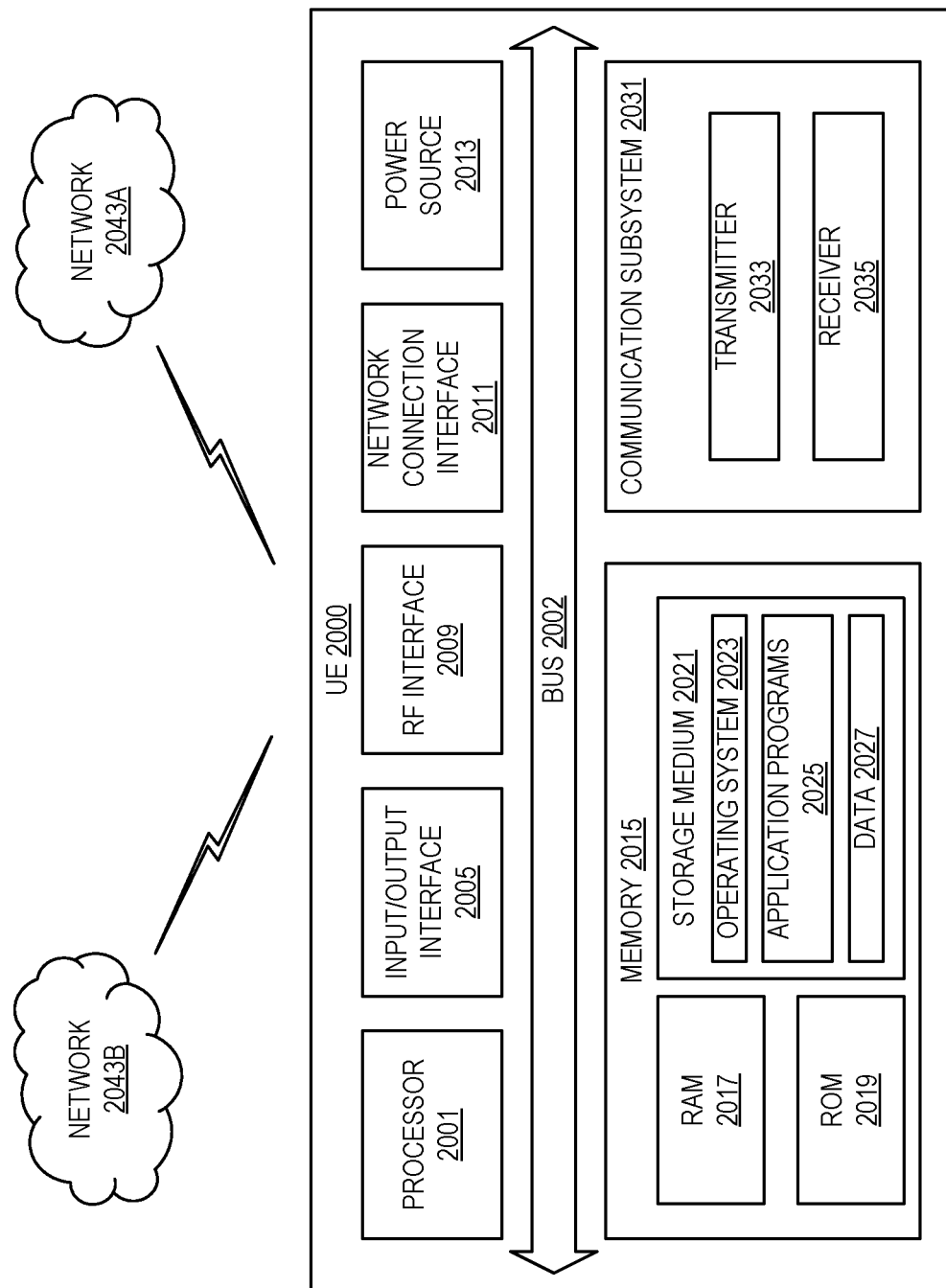
FIG. 20 illustrates one embodiment of a UE in accordance with various aspects described herein.

FIG. 20 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3GPP, including a NB-IoT UE that is not intended for sale to, or operation by, a human user. A UE 2000, as illustrated in FIG. 20, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 20 is a UE, the components discussed herein are equally applicable to a WD, and vice versa.

In FIG. 20, the UE 2000 includes processing circuitry 2001 that is operatively coupled to an input/output interface 2005, a RF interface 2009, a network connection interface 2011, memory 2015 including RAM 2017, ROM 2019, and a storage medium 2021 or the like, a communication subsystem 2031, a power source 2013, and/or any other component, or any combination thereof. The storage medium 2021 includes an operating system 2023, an application program 2025, and data 2027. In other embodiments, the storage medium 2021 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, the processing circuitry 2001 may be configured to process computer instructions and data. The processing circuitry 2001 may be configured to implement any sequential state machine operative to execute machine instructions stored as machine-readable computer programs in the memory 2015, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 2001 may include two CPUs. Data may be information in a form suitable for use by a computer.

In the depicted embodiment, the input/output interface 2005 may be configured to provide a communication interface to an input device, output device, or input and output device. The UE 2000 may be configured to use an output device via the input/output interface 2005. An output device may use the same type of interface port as an input device. For example, a USB port may be used to provide input to and output from the UE 2000. The output device may be a speaker, a sound card, a video card, a display, a monitor, a printer, an actuator, an emitter, a smartcard, another output device, or any combination thereof. The UE 2000 may be configured to use an input device via the input/output interface 2005 to allow a user to capture information into the UE 2000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, the RF interface 2009 may be configured to provide a communication interface to RF components such as a transmitter, a receiver, and an antenna. The network connection interface 2011 may be configured to provide a communication interface to a network 2043A. The network 2043A may encompass wired and/or wireless networks such as a LAN, a WAN, a computer network, a wireless network, a telecommunications network, another like network, or any combination thereof. For example, the network 2043A may comprise a WiFi network. The network connection interface 2011 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 2011 may implement receiver and transmitter functionality appropriate to the communication network links (e.g., optical, electrical, and the like). The transmitter and receiver functions may share circuit components, software, or firmware, or alternatively may be implemented separately.

The RAM 2017 may be configured to interface via a bus 2002 to the processing circuitry 2001 to provide storage or caching of data or computer instructions during the execution of software programs such as the operating system, application programs, and device drivers. The ROM 2019 may be configured to provide computer instructions or data to the processing circuitry 2001. For example, the ROM 2019 may be configured to store invariant low-level system code or data for basic system functions such as basic Input and Output (I/O), startup, or reception of keystrokes from a keyboard that are stored in a non-volatile memory. The storage medium 2021 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 2021 may be configured to include an operating system 2023, an application program 2025 such as a web browser application, a widget or gadget engine or another application, and a data file 2027. The storage medium 2021 may store, for use by the UE 2000, any of a variety of various operating systems or combinations of operating systems.

The storage medium 2021 may be configured to include a number of physical drive units, such as a Redundant Array Of Independent Disks (RAID), floppy disk drive, flash memory, USB flash drive, external hard disk drive, thumb drive, pen drive, key drive, High-Density Digital Versatile Disc (HD-DVD) optical disc drive, internal hard disk drive, Blu-Ray optical disc drive, Holographic Digital Data Storage (HDDS) optical disc drive, external mini-Dual In-Line Memory Module (DIMM), Synchronous Dynamic RAM (SDRAM), external micro-DIMM SDRAM, smartcard memory such as a Subscriber Identity Module (SIM) or a Removable User Identity Module (RUIM) module, other memory, or any combination thereof. The storage medium 2021 may allow the UE 2000 to access computer-executable instructions, application programs, or the like stored on transitory or non-transitory memory media, to off-load data, or to upload data. An article of manufacture, such as one utilizing a communication system, may be tangibly embodied in the storage medium 2021, which may comprise a device readable medium.

In FIG. 20, the processing circuitry 2001 may be configured to communicate with a network 2043B using the communication subsystem 2031.

The network 2043A and the network 2043B may be the same network or networks or different network or networks. The communication subsystem 2031 may be configured to include one or more transceivers used to communicate with the network 2043B. For example, the communication subsystem 2031 may be configured to include one or more transceivers used to communicate with one or more remote transceivers of another device capable of wireless communication such as another WD, UE, or base station of a Radio Access Network (RAN) according to one or more communication protocols, such as IEEE 802.13, Code Division Multiple Access (CDMA), WCDMA, GSM, LTE, Universal Terrestrial RAN (UTRAN), WiMax, or the like. Each transceiver may include a transmitter 2033 and/or a receiver 2035 to implement transmitter or receiver functionality, respectively, appropriate to the RAN links (e.g., frequency allocations and the like). Further, the transmitter 2033 and the receiver 2035 of each transceiver may share circuit components, software, or firmware, or alternatively may be implemented separately.

In the illustrated embodiment, the communication functions of the communication subsystem 2031 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 2031 may include cellular communication, WiFi communication, Bluetooth communication, and GPS communication. The network 2043B may encompass wired and/or wireless networks such as a LAN, a WAN, a computer network, a wireless network, a telecommunications network, another like network, or any combination thereof. For example, the network 2043B may be a cellular network, a WiFi network, and/or a near-field network. The power source 2013 may be configured to provide Alternating Current (AC) or direct current power to components of the UE 2000.

The features, benefits, and/or functions described herein may be implemented in one of the components of the UE 2000 or partitioned across multiple components of the UE 2000. Further, the features, benefits, and/or functions described herein may be implemented in any combination of hardware, software, or firmware. In one example, the communication subsystem 2031 may be configured to include any of the components described herein. Further, the processing circuitry 2001 may be configured to communicate with any of such components over the bus 2002. In another example, any of such components may be represented by program instructions stored in memory that, when executed by the processing circuitry 2001, perform the corresponding functions described herein. In another example, the functionality of any of such components may be partitioned between the processing circuitry 2001 and the communication subsystem 2031. In another example, the non-computationally intensive functions of any of such components may be implemented in software or firmware and the computationally intensive functions may be implemented in hardware.

Figure 21:
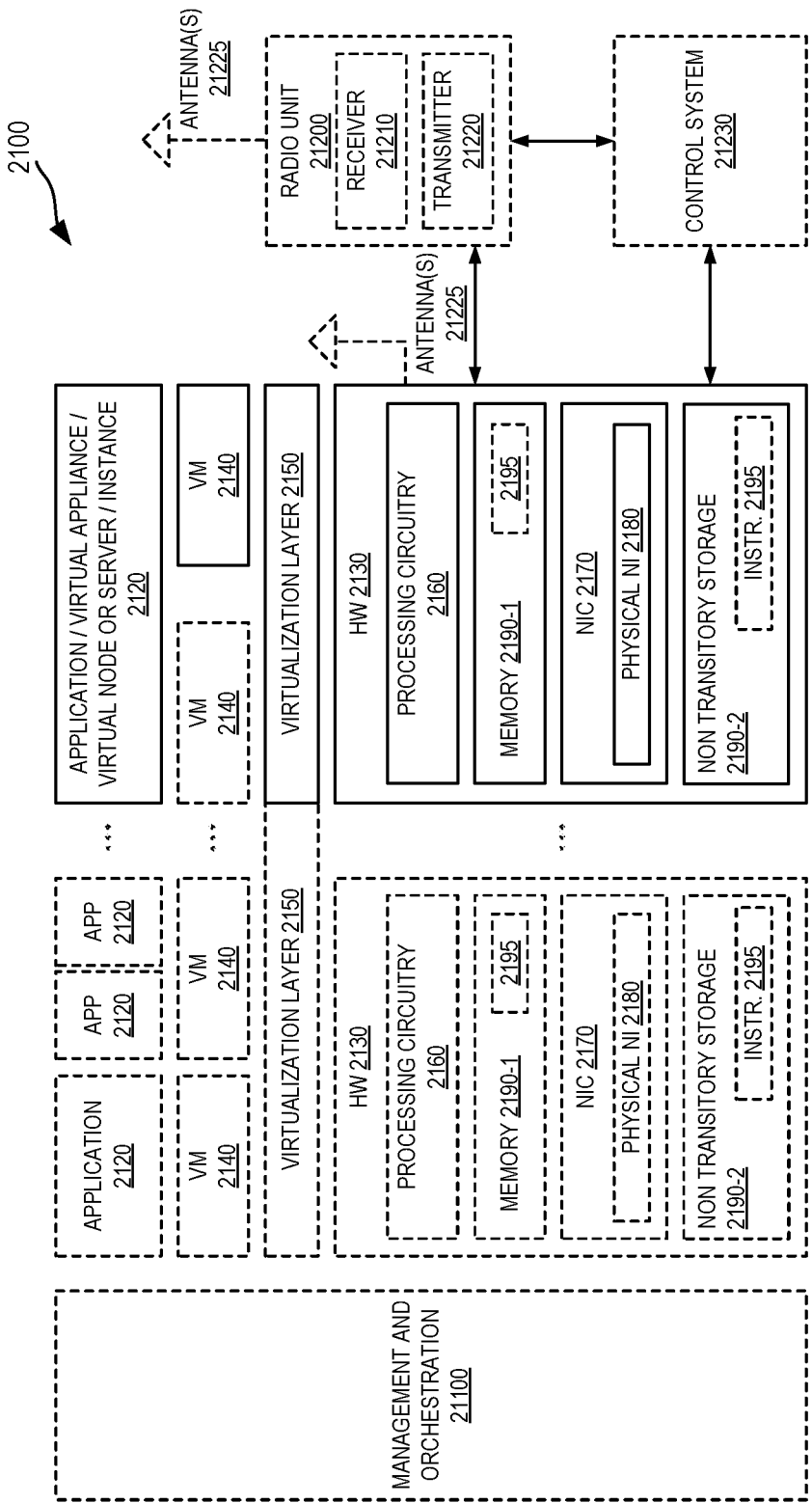
FIG. 21 is a schematic block diagram illustrating a virtualization environment in which functions implemented by some embodiments may be virtualized.

FIG. 21 is a schematic block diagram illustrating a virtualization environment 2100 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 2100 hosted by one or more hardware nodes 2130. Further, in embodiments in which the virtual node is not a radio access node or does not require radio connectivity (e.g., a core network node), then the network node may be entirely virtualized.

The functions may be implemented by one or more applications 2120 (which may alternatively be called software instances, virtual appliances, network functions, virtual nodes, virtual network functions, etc.) operative to implement some of the features, functions, and/or benefits of some of the embodiments disclosed herein. The applications 2120 are run in the virtualization environment 2100 which provides the hardware 2130 comprising processing circuitry 2160 and memory 2190. The memory 2190 contains instructions 2195 executable by the processing circuitry 2160 whereby the application 2120 is operative to provide one or more of the features, benefits, and/or functions disclosed herein.

The virtualization environment 2100 comprises the general-purpose or special-purpose network hardware devices 2130 comprising the set of one or more processors or processing circuitry 2160, which may be Commercial Off-The-Shelf (COTS) processors, dedicated ASICs, or any other type of processing circuitry including digital or analog hardware components or special purpose processors. Each hardware device 2130 may comprise the memory 2190-1 which may be non-persistent memory for temporarily storing the instructions 2195 or software executed by the processing circuitry 2160. Each hardware device 2130 may comprise one or more Network Interface Controllers (NICs) 2170, also known as network interface cards, which include a physical network interface 2180. Each hardware device 2130 may also include non-transitory, persistent, machine-readable storage media 2190-2 having stored therein software 2195 and/or instructions executable by the processing circuitry 2160. The software 2195 may include any type of software including software for instantiating one or more virtualization layers 2150 (also referred to as hypervisors), software to execute virtual machines 2140 as well as software allowing it to execute functions, features, and/or benefits described in relation with some embodiments described herein.

The virtual machines 2140 comprise virtual processing, virtual memory, virtual networking or interface, and virtual storage, and may be run by a corresponding virtualization layer 2150 or hypervisor. Different embodiments of the instance of the virtual appliance 2120 may be implemented on one or more of the virtual machines 2140, and the implementations may be made in different ways.

During operation, the processing circuitry 2160 executes the software 2195 to instantiate the hypervisor or virtualization layer 2150, which may sometimes be referred to as a Virtual Machine Monitor (VMM). The virtualization layer 2150 may present a virtual operating platform that appears like networking hardware to the virtual machine 2140.

As shown in FIG. 21, the hardware 2130 may be a standalone network node with generic or specific components. The hardware 2130 may comprise an antenna 21225 and may implement some functions via virtualization. Alternatively, the hardware 2130 may be part of a larger cluster of hardware (e.g., such as in a data center or CPE) where many hardware nodes work together and are managed via a Management and Orchestration (MANO) 21100, which, among others, oversees lifecycle management of the applications 2120.

Virtualization of the hardware 2130 is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 2140 may be a software implementation of a physical machine that runs programs as if they were executing on a physical, non-virtualized machine. Each of the virtual machines 2140, and that part of the hardware 2130 that executes that virtual machine 2140, be it hardware dedicated to that virtual machine 2140 and/or hardware shared by that virtual machine 2140 with others of the virtual machines 2140, forms a separate Virtual Network Element (VNE).

Still in the context of NFV, a Virtual Network Function (VNF) is responsible for handling specific network functions that run in the one or more virtual machines 2140 on top of the hardware networking infrastructure 2130 and corresponds to the application 2120 in FIG. 21.

In some embodiments, one or more radio units 21200 that each include one or more transmitters 21220 and one or more receivers 21210 may be coupled to one or more antennas 21225. The radio units 21200 may communicate directly with the hardware nodes 2130 via one or more appropriate network interfaces and may be used in combination with the virtual components to provide a virtual node with radio capabilities, such as a radio access node or a base station.

In some embodiments, some signaling can be effected with the use of a control system 21230 which may alternatively be used for communication between the hardware nodes 2130 and the radio units 21200.

Figure 22:
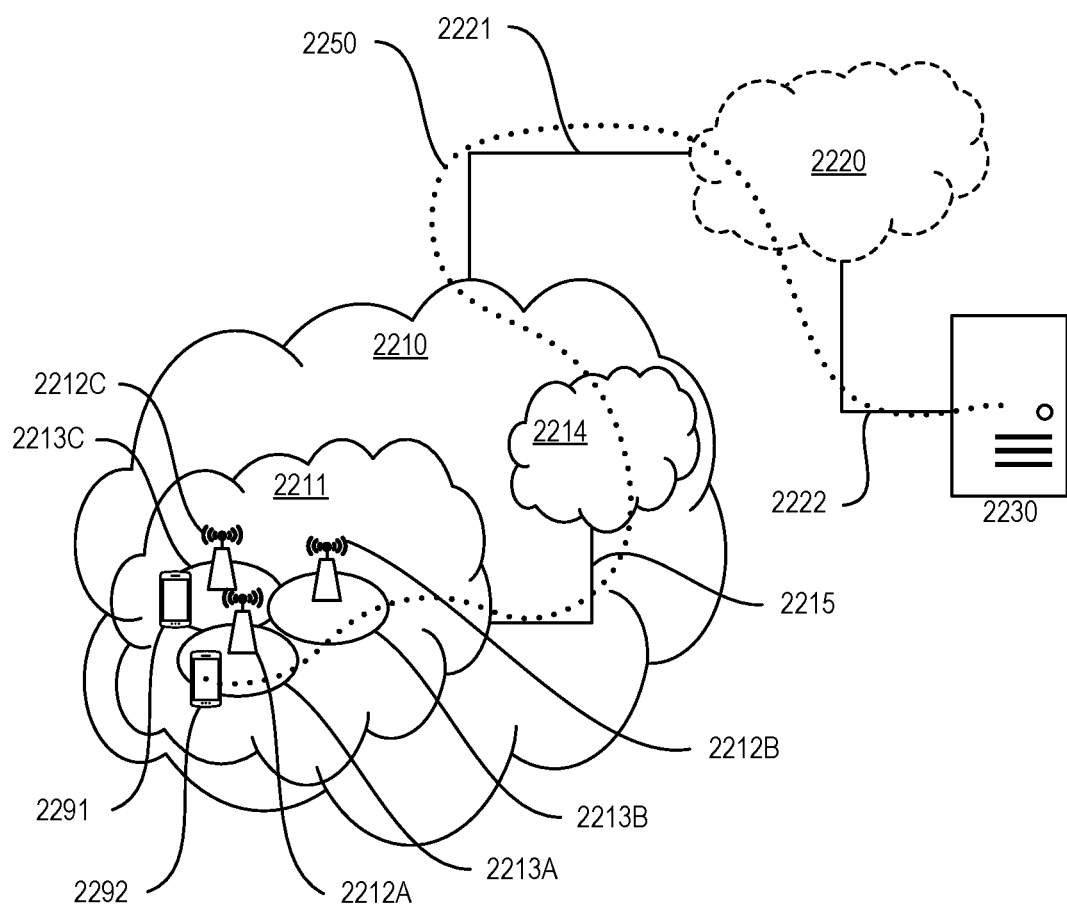
FIG. 22 illustrates a telecommunication network connected via an intermediate network to a host computer in accordance with some embodiments of the present disclosure.

With reference to FIG. 22, in accordance with an embodiment, a communication system includes a telecommunication network 2210, such as a 3GPP-type cellular network, which comprises an access network 2211, such as a radio access network, and a core network 2214. The access network 2211 comprises a plurality of base stations 2212A, 2212B, 2212C, such as Node Bs, eNBs, gNBs, or other types of wireless APs, each defining a corresponding coverage area 2213A, 2213B, 2213C. Each base station 2212A, 2212B, 2212C is connectable to the core network 2214 over a wired or wireless connection 2215. A first UE 2291 located in coverage area 2213C is configured to wirelessly connect to, or be paged by, the corresponding base station 2212C. A second UE 2292 in coverage area 2213A is wirelessly connectable to the corresponding base station 2212A. While a plurality of UEs 2291, 2292 are illustrated in this example, the disclosed embodiments are equally applicable to a situation where a sole UE is in the coverage area 2213 or where a sole UE is connecting to the corresponding base station 2212.

The telecommunication network 2210 is itself connected to a host computer 2230, which may be embodied in the hardware and/or software of a standalone server, a cloud-implemented server, a distributed server, or as processing resources in a server farm. The host computer 2230 may be under the ownership or control of a service provider, or may be operated by the service provider or on behalf of the service provider. Connections 2221 and 2222 between the telecommunication network 2210 and the host computer 2230 may extend directly from the core network 2214 to the host computer 2230 or may go via an optional intermediate network 2220. The intermediate network 2220 may be one of, or a combination of more than one of, a public, private, or hosted network; the intermediate network 2220, if any, may be a backbone network or the Internet; in particular, the intermediate network 2220 may comprise two or more sub-networks (not shown).

The communication system of FIG. 22 as a whole enables connectivity between the connected UEs 2291, 2292 and the host computer 2230. The connectivity may be described as an Over-the-Top (OTT) connection 2250. The host computer 2230 and the connected UEs 2291, 2292 are configured to communicate data and/or signaling via the OTT connection 2250 using the access network 2211, the core network 2214, any intermediate network 2220, and possible further infrastructure (not shown) as intermediaries. The OTT connection 2250 may be transparent in the sense that the participating communication devices through which the OTT connection 2250 passes are unaware of routing of uplink and downlink communications. For example, the base station 2212 may not or need not be informed about the past routing of an incoming downlink communication with data originating from the host computer 2230 to be forwarded (e.g., handed over) to a connected UE 2291. Similarly, the base station 2212 need not be aware of the future routing of an outgoing uplink communication originating from the UE 2291 towards the host computer 2230.

Example implementations in accordance with an embodiment of the UE, base station, and host computer discussed in the preceding paragraphs will now be described with reference to FIG. 23. In a communication system 2300, a host computer 2310 comprises hardware 2315 including a communication interface 2316 configured to set up and maintain a wired or wireless connection with an interface of a different communication device of the communication system 2300. The host computer 2310 further comprises processing circuitry 2318, which may have storage and/or processing capabilities. In particular, the processing circuitry 2318 may comprise one or more programmable processors, ASICs, FPGAs, or combinations of these (not shown) adapted to execute instructions. The host computer 2310 further comprises software 2311, which is stored in or accessible by the host computer 2310 and executable by the processing circuitry 2318. The software 2311 includes a host application 2312. The host application 2312 may be operable to provide a service to a remote user, such as a UE 2330 connecting via an OTT connection 2350 terminating at the UE 2330 and the host computer 2310. In providing the service to the remote user, the host application 2312 may provide user data which is transmitted using the OTT connection 2350.

The communication system 2300 further includes a base station 2320 provided in a telecommunication system and comprising hardware 2325 enabling it to communicate with the host computer 2310 and with the UE 2330. The hardware 2325 may include a communication interface 2326 for setting up and maintaining a wired or wireless connection with an interface of a different communication device of the communication system 2300, as well as a radio interface 2327 for setting up and maintaining at least a wireless connection 2370 with UE the 2330 located in a coverage area (not shown in FIG. 23) served by the base station 2320. The communication interface 2326 may be configured to facilitate a connection 2360 to the host computer 2310. The connection 2360 may be direct or it may pass through a core network (not shown in FIG. 23) of the telecommunication system and/or through one or more intermediate networks outside the telecommunication system. In the embodiment shown, the hardware 2325 of the base station 2320 further includes processing circuitry 2328, which may comprise one or more programmable processors, ASICs, FPGAs, or combinations of these (not shown) adapted to execute instructions. The base station 2320 further has software 2321 stored internally or accessible via an external connection.

The communication system 2300 further includes the UE 2330 already referred to. Its hardware 2335 may include a radio interface 2337 configured to set up and maintain the wireless connection 2370 with the base station 2320 serving a coverage area in which the UE 2330 is currently located. The hardware 2335 of the UE 2330 further includes processing circuitry 2338, which may comprise one or more programmable processors, ASICs, FPGAs, or combinations of these (not shown) adapted to execute instructions. The UE 2330 further comprises software 2331, which is stored in or accessible by the UE 2330 and executable by the processing circuitry 2338. The software 2331 includes a client application 2332. The client application 2332 may be operable to provide a service to a human or non-human user via the UE 2330, with the support of the host computer 2310. In the host computer 2310, an executing host application 2312 may communicate with the executing client application 2332 via the OTT connection 2350 terminating at the UE 2330 and the host computer 2310. In providing the service to the user, the client application 2332 may receive request data from the host application 2312 and provide user data in response to the requested data. The OTT connection 2350 may transfer both the request data and the user data. The client application 2332 may interact with the user to generate the user data that it provides.

Figure 23:
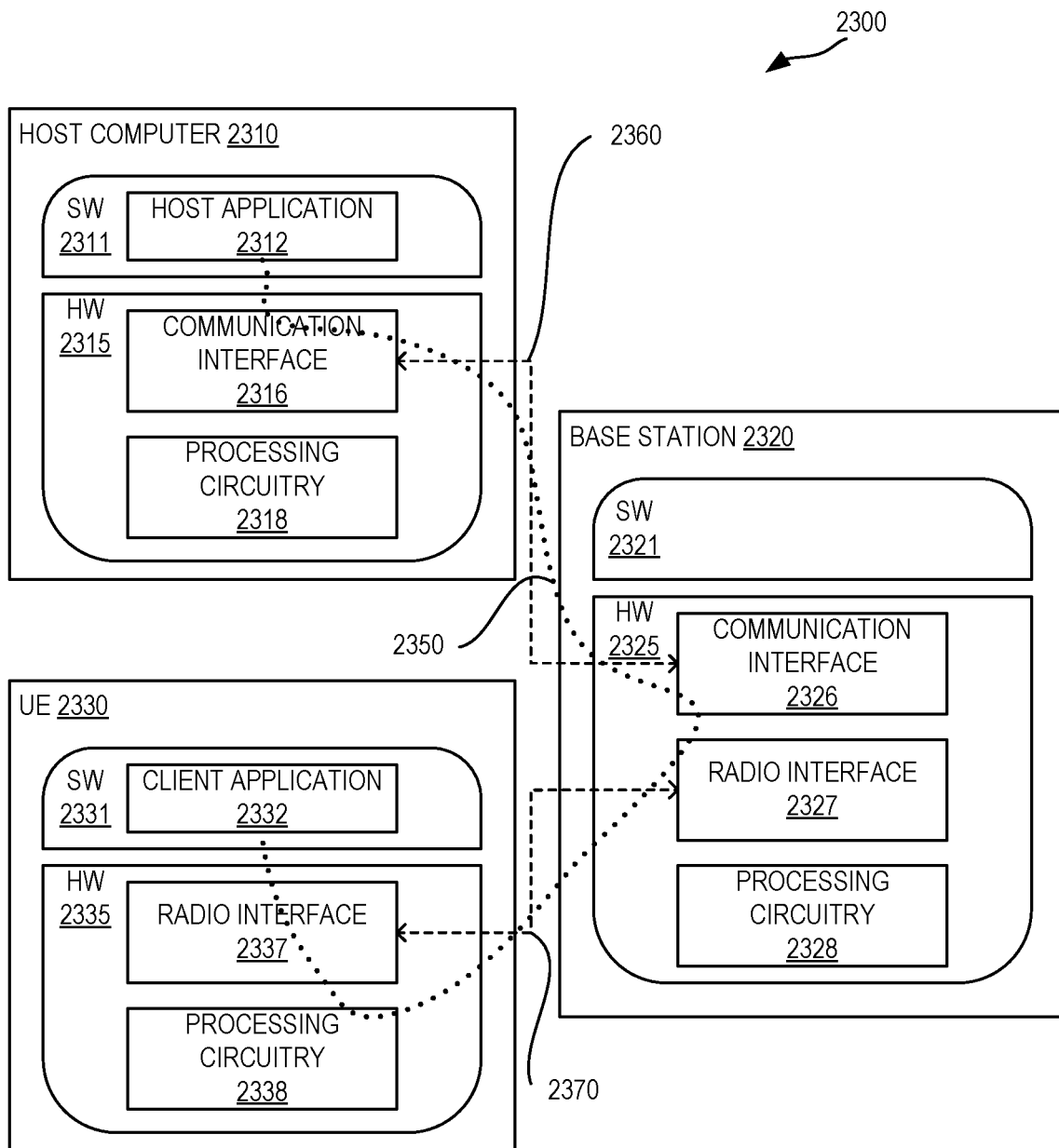
FIG. 23 is a generalized block diagram of a host computer communicating via a base station with a UE over a partially wireless connection in accordance with some embodiments of the present disclosure.

It is noted that the host computer 2310, the base station 2320, and the UE 2330 illustrated in FIG. 23 may be similar or identical to the host computer 2230, one of the base stations 2212A, 22128, 2212C and one of UEs 2291, 2292 of FIG. 22, respectively. This is to say, the inner workings of these entities may be as shown in FIG. 23 and independently, the surrounding network topology may be that of FIG. 22.

In FIG. 23, the OTT connection 2350 has been drawn abstractly to illustrate the communication between the host computer 2310 and the UE 2330 via the base station 2320, without explicit reference to any intermediary devices and the precise routing of messages via these devices. Network infrastructure may determine the routing, which it may be configured to hide from the UE 2330 or from the service provider operating the host computer 2310, or both. While the OTT connection 2350 is active, the network infrastructure may further take decisions by which it dynamically changes the routing (e.g., on the basis of load balancing consideration or reconfiguration of the network).

The wireless connection 2370 between the UE 2330 and the base station 2320 is in accordance with the teachings of the embodiments described throughout this disclosure. One or more of the various embodiments improve the performance of OTT services provided to the UE 2330 using the OTT connection 2350, in which the wireless connection 2370 forms the last segment. More precisely, the teachings of these embodiments may improve the mobility and signaling overhead and thereby may provide some benefits such as avoiding race conditions between network nodes, reduced signaling and procedures on network node and/or wireless device sides, improved mobility, traffic steering, and load balancing.

A measurement procedure may be provided for the purpose of monitoring data rate, latency, and other factors on which the one or more embodiments improve. There may further be an optional network functionality for reconfiguring the OTT connection 2350 between the host computer 2310 and the UE 2330, in response to variations in the measurement results. The measurement procedure and/or the network functionality for reconfiguring the OTT connection 2350 may be implemented in the software 2311 and the hardware 2315 of the host computer 2310 or in the software 2331 and the hardware 2335 of the UE 2330, or both. In some embodiments, sensors (not shown) may be deployed in or in association with communication devices through which the OTT connection 2350 passes; the sensors may participate in the measurement procedure by supplying values of the monitored quantities exemplified above, or supplying values of other physical quantities from which the software 2311, 2331 may compute or estimate the monitored quantities. The reconfiguring of the OTT connection 2350 may include message format, retransmission settings, preferred routing etc.; the reconfiguring need not affect the base station 2320, and it may be unknown or imperceptible to the base station 2320. Such procedures and functionalities may be known and practiced in the art. In certain embodiments, measurements may involve proprietary UE signaling facilitating the host computer 2310's measurements of throughput, propagation times, latency, and the like. The measurements may be implemented in the software 2311 and 2331 causes messages to be transmitted, in particular empty or 'dummy' messages, using the OTT connection 2350 while it monitors propagation times, errors, etc.

Figures 24, 25:
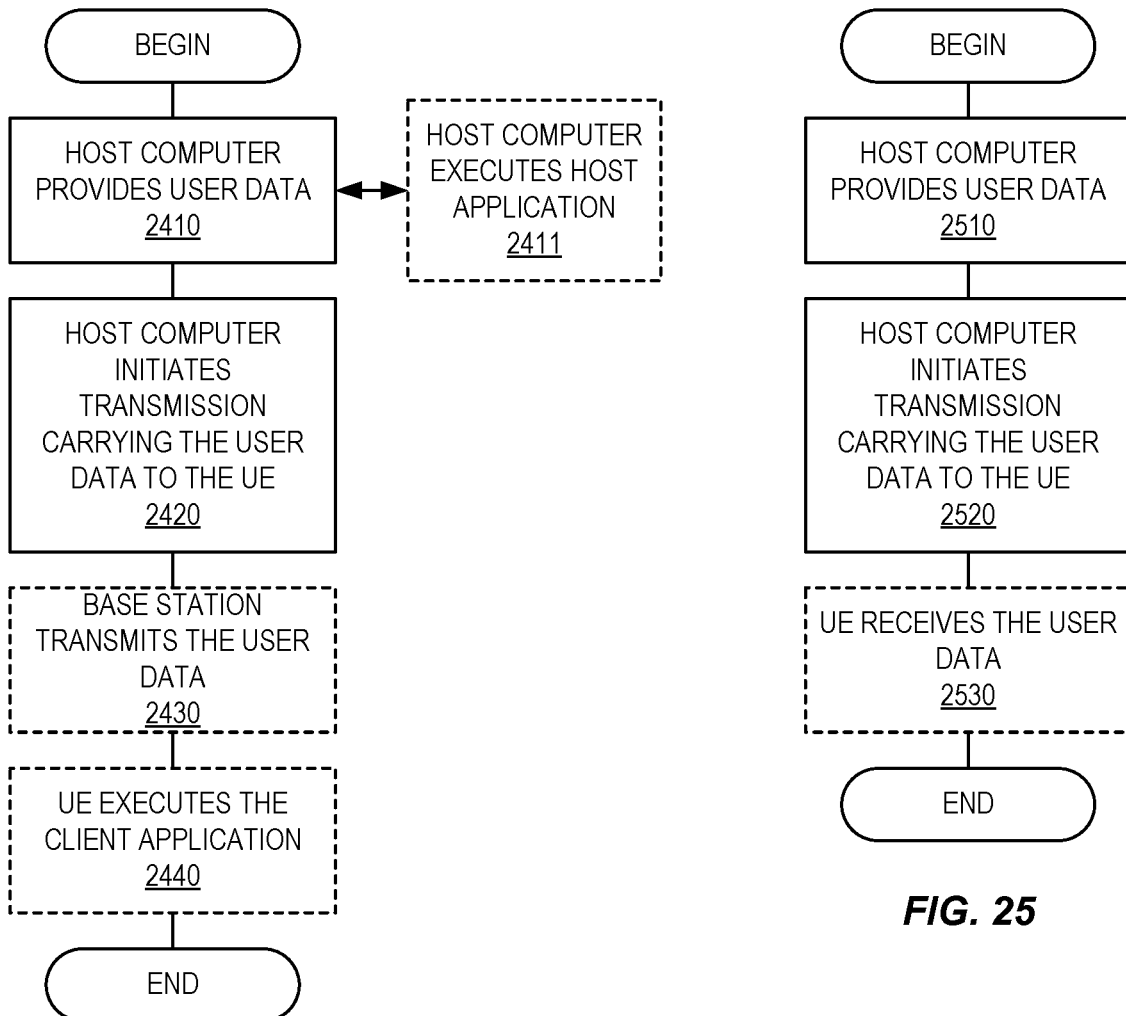
FIG. 24 is a flowchart illustrating a method implemented in a communication system in accordance with one embodiment of the present disclosure.
FIG. 25 is a flowchart illustrating a method implemented in a communication system in accordance with one embodiment of the present disclosure.

FIG. 24 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 24 will be included in this section. In step 2410, the host computer provides user data. In substep 2411 (which may be optional) of step 2410, the host computer provides the user data by executing a host application. In step 2420, the host computer initiates a transmission carrying the user data to the UE. In step 2430 (which may be optional), the base station transmits to the UE the user data which was carried in the transmission that the host computer initiated, in accordance with the teachings of the embodiments described throughout this disclosure. In step 2440 (which may also be optional), the UE executes a client application associated with the host application executed by the host computer.

FIG. 25 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 25 will be included in this section. In step 2510 of the method, the host computer provides user data. In an optional substep (not shown) the host computer provides the user data by executing a host application. In step 2520, the host computer initiates a transmission carrying the user data to the UE. The transmission may pass via the base station, in accordance with the teachings of the embodiments described throughout this disclosure. In step 2530 (which may be optional), the UE receives the user data carried in the transmission.

FIG. 26 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 26 will be included in this section. In step 2610 (which may be optional), the UE receives input data provided by the host computer. Additionally or alternatively, in step 2620, the UE provides user data. In substep 2621 (which may be optional) of step 2620, the UE provides the user data by executing a client application. In substep 2611 (which may be optional) of step 2610, the UE executes a client application which provides the user data in reaction to the received input data provided by the host computer. In providing the user data, the executed client application may further consider user input received from the user. Regardless of the specific manner in which the user data was provided, the UE initiates, in substep 2630 (which may be optional), transmission of the user data to the host computer. In step 2640 of the method, the host computer receives the user data transmitted from the UE, in accordance with the teachings of the embodiments described throughout this disclosure.

FIG. 27 is a flowchart illustrating a method implemented in a communication system, in accordance with one embodiment. The communication system includes a host computer, a base station, and a UE which may be those described with reference to FIGS. 22 and 23. For simplicity of the present disclosure, only drawing references to FIG. 27 will be included in this section. In step 2710 (which may be optional), in accordance with the teachings of the embodiments described throughout this disclosure, the base station receives user data from the UE. In step 2720 (which may be optional), the base station initiates transmission of the received user data to the host computer. In step 2730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to one or more embodiments of the present disclosure.

Figure 28:
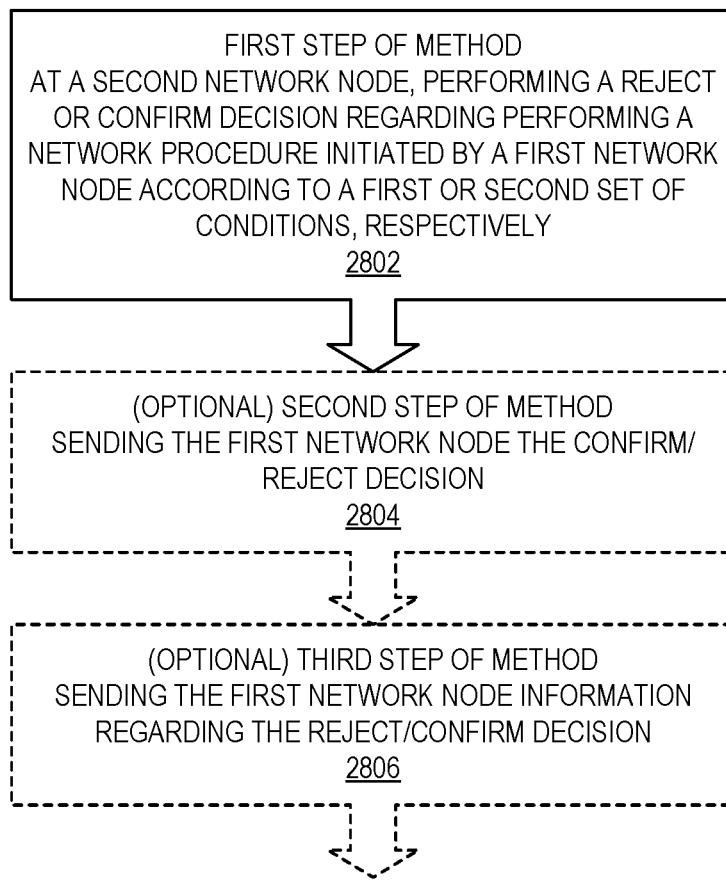
FIG. 28 depicts a method in accordance with particular embodiments of the present disclosure.

FIG. 28 depicts a method in accordance with particular embodiments, the method begins at step 2802 with at a second network node, performing a reject or confirm decision regarding performing a network procedure initiated by a first network node, according to a first or second set of conditions, respectively. At step 2804, optionally, the second network node sends the first network node the confirm/reject decision. At step 2806, the second network node send the first network node information about the cause of the reject/confirm decision.

Figure 29:
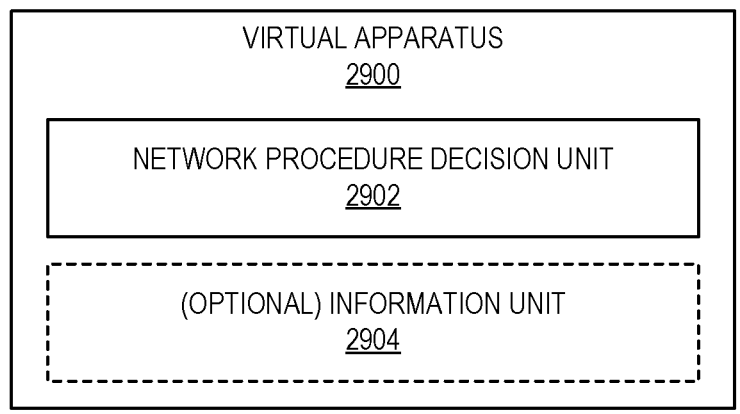
FIG. 29 illustrates a schematic block diagram of an apparatus in a wireless network in accordance with embodiments of the present disclosure.

FIG. 29 illustrates a schematic block diagram of an apparatus 2900 in a wireless network (for example, the wireless network shown in FIG. 19). The apparatus may be implemented in a wireless device or network node (e.g., the wireless device 1910 or the network node 1960 shown in FIG. 19). The apparatus 2900 is operable to carry out the example method described with reference to FIG. 28 and possibly any other processes or methods disclosed herein. It is also to be understood that the method of FIG. 28 is not necessarily carried out solely by the apparatus 2900. At least some operations of the method can be performed by one or more other entities.

The virtual apparatus 2900 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in the memory includes program instructions for executing one or more telecommunications and/or data communications protocols as well as instructions for carrying out one or more of the techniques described herein, in several embodiments. In some implementations, the processing circuitry may be used to cause a network procedure decision unit 2902 and an optional information unit 2904 and any other suitable units of the apparatus 2900 to perform corresponding functions according to one or more embodiments of the present disclosure.

As illustrated in FIG. 29, the apparatus 2900 includes the network procedure decision unit 2902 and the information unit 2904 are configured to perform reject/confirm decisions for network procedures initiated by a first network node and inform the first network node about the decision (and optionally about the cause of the decision), respectively.

The term unit may have conventional meaning in the field of electronics, electrical devices, and/or electronic devices and may include, for example, electrical and/or electronic circuitry, devices, modules, processors, memories, logic solid state and/or discrete devices, computer programs, or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
5GC Fifth Generation Core Network
AC Alternating Current
AP Access Point
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
COTS Commercial Off-the-Shelf
CP Cyclic Prefix
CPE Customer Premise Equipment
CPU Central Processing Unit
D2D Device-to-Device
DAS Distributed Antenna System
DC Dual Connectivity
DIMM Dual In-Line Memory Module
DRB Data Radio Bearer
DSP Digital Signal Processor
DVD Digital Video Disk
EEPROM Electrically Erasable Programmable Read Only Memory
eNB Enhanced or Evolved Node B
EN-DC Enhanced Universal Terrestrial Radio Access Network Dual Connectivity
EPROM Erasable Programmable Read Only Memory
E-SMLC Evolved Serving Mobile Location Center
FFS For Further Study
FPGA Field Programmable Gate Array
GHz Gigahertz
gNB New Radio Base Station
GPS Global Positioning System
GSM Global System for Mobile Communications
HDDS Holographic Digital Data Storage
HD-DVD High-Density Digital Versatile Disc
HO Handover
ID Identifier
IE Information Element
I/O Input and Output
IoT Internet of Things
IP Internet Protocol
LAN Local Area Network
LEE Laptop Embedded Equipment
LME Laptop Mounted Equipment
LTE Long Term Evolution
M2M Machine-to-Machine
MAC Medium Access Control
MANO Management and Orchestration
MCE Multi-Cell/Multicast Coordination Entity
MCG Master Cell Group
MDT Minimization of Drive Tests
MeNB Master Enhanced or Evolved Node B
MgNB Master New Radio Base Station
MIMO Multiple Input Multiple Output
MME Mobility Management Entity
MN Master Node
MR-DC Multi-Radio Access Technology Dual Connectivity
MSC Mobile Switching Center MSR Multi-Standard Radio
MTC Machine Type Communication
NB-IoT Narrowband Internet of Things
NFV Network Function Virtualization
NG Next Generation
NIC Network Interface Controller
NR New Radio
O&M Operation and Maintenance
OSS Operations Support System
OTT Over-the-Top
PDA Personal Digital Assistant
PDCP Packet Data Convergence Protocol
PDU Protocol Data Unit
P-GW Packet Data Network Gateway
PROM Programmable Read Only Memory
PSCell Primary Secondary Cell
PSTN Public Switched Telephone Networks
QoS Quality of Service
RACH Random Access Channel
RAID Redundant Array Of Independent Disks
RAM Random Access Memory
RAN Radio Access Network
RAT Radio Access Technology
RF Radio Frequency
RLC Radio Link Control
RLF Radio Link Failure
RNC Radio Network Controller
ROM Read Only Memory
RRC Radio Resource Control
RRH Remote Radio Head
RRM Radio Resource Monitoring
RRU Remote Radio Unit
RUIM Removable User Identity Module
SCEF Service Capability Exposure Function
SCell Secondary Cell
SCG Secondary Cell Group
SDRAM Synchronous Dynamic Random Access Memory
SeNB Secondary Enhanced or Evolved Node B
SgNB Secondary New Radio Base Station
S-GW Serving Gateway
SIM Subscriber Identity Module
S-KgNB Secondary Node Key
SN Secondary Node
SOC System on a Chip
SON Self-Organizing Network
SONET Synchronous Optical Networking
SRB Signaling Radio Bearer
TCP Transmission Control Protocol
TEID Tunnel Endpoint Identifier
TR Technical Report
TS Technical Specification
UE User Equipment
UMTS Universal Mobile Telecommunications System
UPF User Plane Function
USB Universal Serial Bus
UTRAN Universal Terrestrial Radio Access Network
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method in a secondary node for providing, along with a master node, dual connectivity for a wireless device such that the wireless device is configured to utilize resources provided by both the master node and the secondary node in a wireless communication network, comprising:
   receiving, from the master node, a release request; and
   determining that the secondary node is permitted to reject the release request responsive to receiving the release request.

2. The method of claim 1, wherein the release request comprises an indication of a cause of the release request, and wherein determining comprises determining that the secondary node is permitted to reject the release request based on the cause of the release request.

3. The method of claim 1 further comprising:
   after determining that the secondary node is permitted to reject the release request, sending a release reject to the master node, the release reject being an indication that the secondary node rejects the release request;
   wherein the release reject comprises an indication of a cause of the release reject.

4. The method of claim 3 wherein the cause of the release reject is a cause related to mobility, a cause related to load balancing, or a cause related to inactivity.

5. The method of claim 1 wherein the master node and the secondary node are of different radio access technologies.

6. The method of claim 5 wherein the master node is a master Long Term Evolution, LTE, node and the secondary node is a secondary New Radio, NR, node.

7. The method of claim 5 wherein the master node is a master New Radio, NR, node and the secondary node is a secondary Long Term Evolution, LTE, node.

8. The method of claim 1 wherein receiving the release request is part of:
   a secondary node release procedure initiated by the master node;
   a secondary node change procedure initiated by the master node;
   a Secondary Cell Group, SCG, change procedure;
   an inter-master node handover with secondary node change procedure; or
   a master node to enhanced or evolved Node B/NR base station, eNB/gNB, change procedure.

9. The method of claim 1, wherein the release request is a request to release a wireless device context of the wireless device or to release resources for the wireless device.

10. A secondary node for providing, along with a master node, dual connectivity for a wireless device such that the wireless device is configured to utilize resources provided by both the master node and the secondary node in a wireless communication network, the secondary node comprising:
    processing circuitry configured to,
      receive, from the master node, a release request, and
      determine that the secondary node is permitted to reject the release request.

11. The secondary node of claim 10, wherein the release request comprises an indication of a cause of the release request, and wherein determining comprises determining that the secondary node is permitted to reject the release request based on the cause of the release request.

12. The secondary node of claim 10, wherein the processing circuitry is further configured to, send a release reject to the master node after determining that the secondary node is permitted to reject the release request, the release reject being an indication that the secondary node rejects the release request;

wherein the release reject comprises an indication of a cause of the release reject.

13. A method in a master node for providing, along with a secondary node, dual connectivity for a wireless device such that the wireless device is configured to utilize resources provided by both the master node and the secondary node in a wireless communication network, comprising:

sending, to the secondary node, a release request; and receiving a release reject from the secondary node, the release reject being an indication that the secondary node rejects the release request.

14. The method of claim 13, wherein the release reject comprises an indication of a cause of the release reject.

15. The method of claim 14 wherein the cause of the release reject is a cause related to mobility, a cause related to load balancing, or a cause related to inactivity.

16. The method of claim 13, wherein the master node and the secondary node are of different radio access technologies.

17. The method of claim 16, wherein the master node is a master Long Term Evolution, LTE, node and the secondary node is a secondary New Radio, NR, node.

18. The method of claim 16, wherein the master node is a master New Radio, NR, node and the secondary node is a secondary Long Term Evolution, LTE, node.

19. The method of claim 13, wherein the release request is part of:

a secondary node release procedure initiated by the master node;

a secondary node change procedure initiated by the master node;

a Secondary Cell Group, SCG, change procedure;

an inter-master node handover with secondary node change procedure; or a master node to enhanced or evolved Node B/NR base station, eNB/gNB, change procedure.

* * * * *

UNITED STATES PATENT AND TRADEMARK OFFICE
CERTIFICATE OF CORRECTION

PATENT NO. : 10,917,934 B2
APPLICATION NO. : 16/744300
DATED : February 9, 2021
INVENTOR(S) : Yilmaz et al.

Page 1 of 2

It is certified that error appears in the above-identified patent and that said Letters Patent is hereby corrected as shown below:

On the Title Page

Item (57), under "ABSTRACT", in Column 2, Line 2, delete "device is a" and insert -- device in a --, therefor.

On Page 2, in item (56), under "OTHER PUBLICATIONS", in Column 1, Line 9, delete "SNrelease—TP" and insert -- SN release—TP --, therefor.

In the Drawings

In Fig. 15, Sheet 13 of 24, in Point "2.", in Line 1, delete "CHANGE IN" and insert -- CHANGE --, therefor.

In Fig. 15, Sheet 13 of 24, in Point "3", in Line 3, delete "IN INTERRUPTED" and insert -- INTERRUPTED --, therefor.

In the Specification

In Column 1, Line 11, delete "2019," and insert -- 2018, now Pat. No. 10,568,162, --, therefor.

Figure 3:
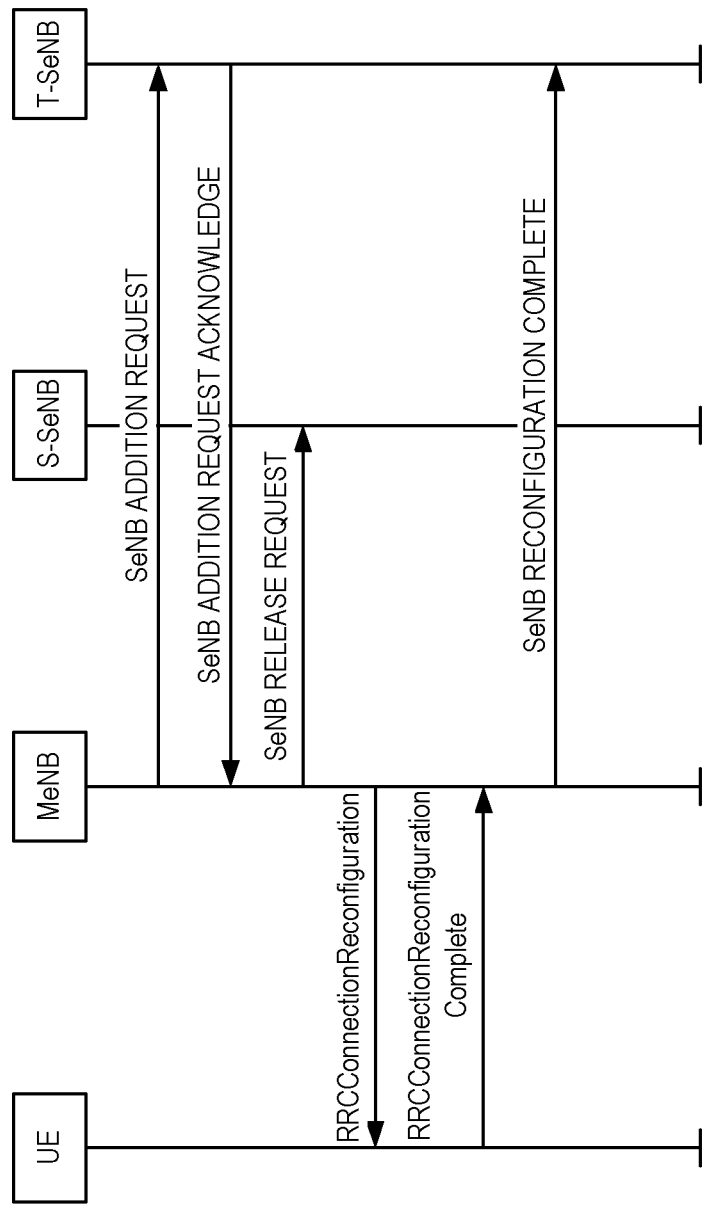
FIG. 3 illustrates the SeNB change procedure in the case of DC in LTE.

In Column 2, Line 36, delete "in 3" and insert -- in FIG. 3 --, therefor.

In Column 23, Line 6, delete "Session Path Switch procedure." and insert the same at Line 5, after "PDU" as a continuation paragraph.

In Column 28, Line 53, delete "(CPE) a" and insert -- (CPE), a --, therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 10,917,934 B2

In Column 29, Line 41, delete "radio front end circuitry 1914" and insert -- radio front end circuitry 1912 --, therefor.

In Column 38, Line 60, delete "22128," and insert -- 2212B, --, therefor.